(12) United States Patent
Saito et al.

(10) Patent No.: US 6,940,519 B2
(45) Date of Patent: Sep. 6, 2005

(54) GRAPHICS PROCESSOR, GRAPHICS CARD AND GRAPHICS PROCESSING SYSTEM

(75) Inventors: Takahiro Saito, Yokohama (JP); Atsushi Kunimatsu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 61 days.

(21) Appl. No.: 10/619,435

(22) Filed: Jul. 16, 2003

(65) Prior Publication Data

US 2004/0207624 A1 Oct. 21, 2004

(30) Foreign Application Priority Data

Apr. 17, 2003 (JP) .......................................... 2003-113188

(51) Int. Cl.⁷ ................................................ G06F 12/06

(52) U.S. Cl. ........................ 345/572; 345/426; 345/506

(58) Field of Search ................................. 345/501, 502, 345/505, 506, 531, 564, 572–574, 418, 419, 426, 582, 552, 422, 545, 530

(56) References Cited

U.S. PATENT DOCUMENTS

| | | | | |
|---|---|---|---|---|
| 5,815,166 A | * | 9/1998 | Baldwin | 345/506 |
| 6,181,352 B1 | | 1/2001 | Kirk et al. | |
| 6,333,744 B1 | | 12/2001 | Kirk et al. | |
| 6,606,673 B2 | * | 8/2003 | Suzuki et al. | 345/537 |
| 6,762,764 B2 | * | 7/2004 | Hiwada et al. | 345/506 |
| 6,809,422 B2 | * | 10/2004 | Saito et al. | 345/505 |

\* cited by examiner

*Primary Examiner*—Kee M. Tung
(74) *Attorney, Agent, or Firm*—Oblon, Spivak, McClelland, Maier & Neustadt, P.C.

(57) ABSTRACT

A graphics processor includes a shading processing section which subjects pixel data to a shading process, a first path which permits map data and texture data output from a video memory to be input to the shading processing section, a second path which permits pixel data output from the shading processing section to be output to the video memory, and a third path which permits pixel data output from a pixel expanding section to be input to the shading processing section. Further, the third path permits pixel data output from the video memory to be input to the shading processing section instead of the pixel data output from the pixel expanding section.

51 Claims, 20 Drawing Sheets

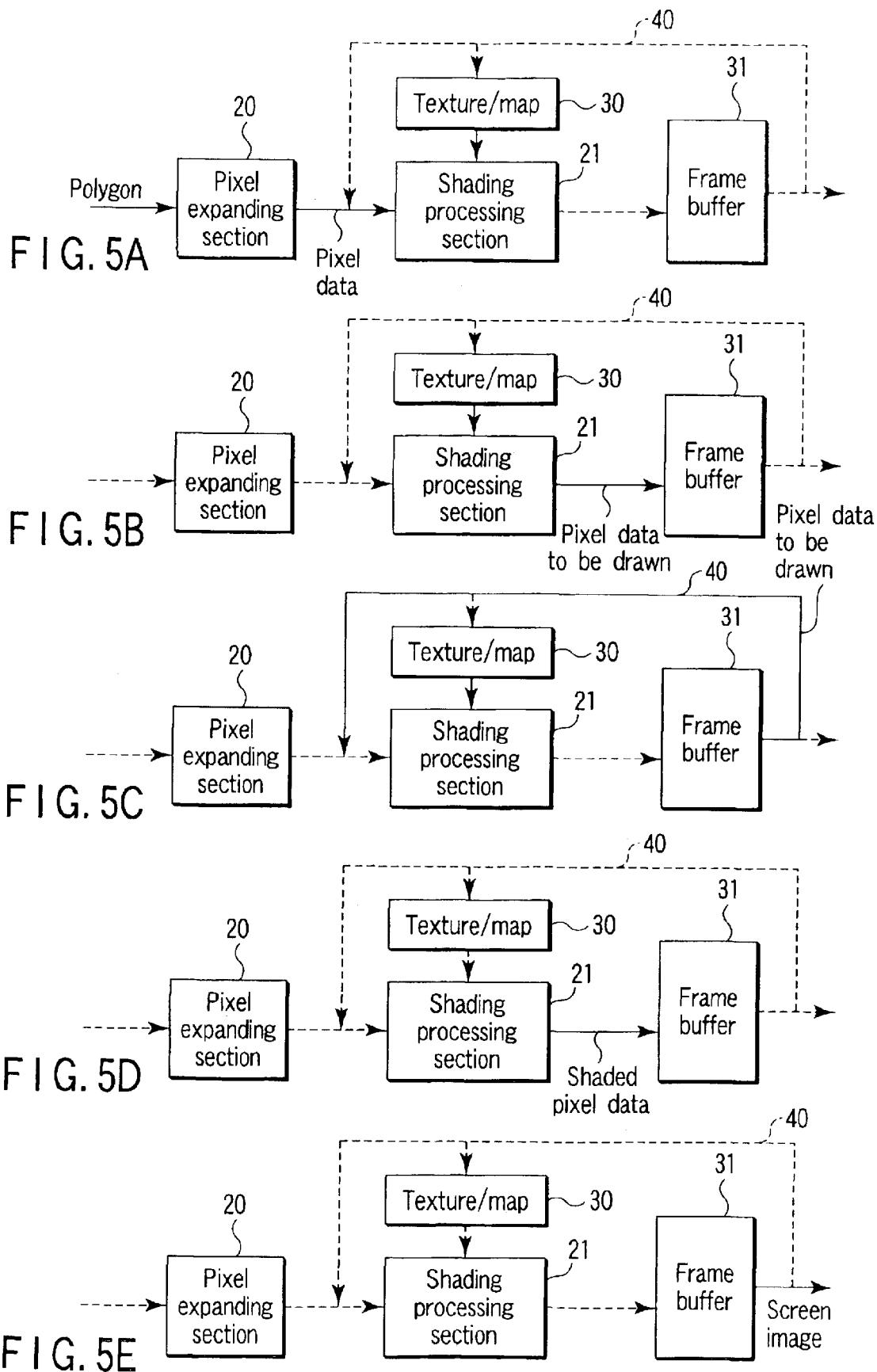

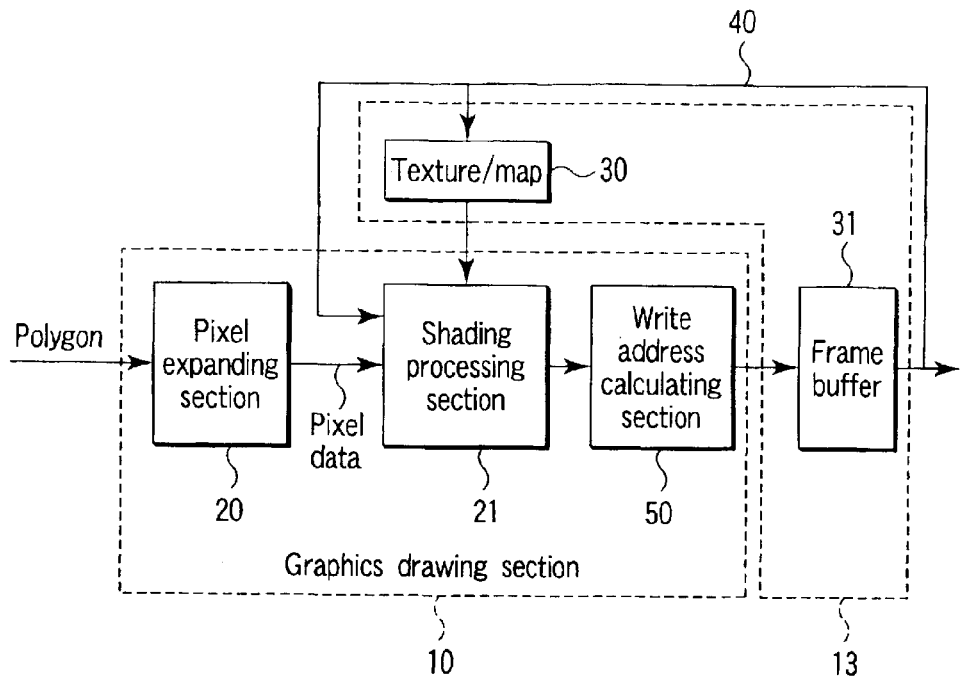
F I G. 10
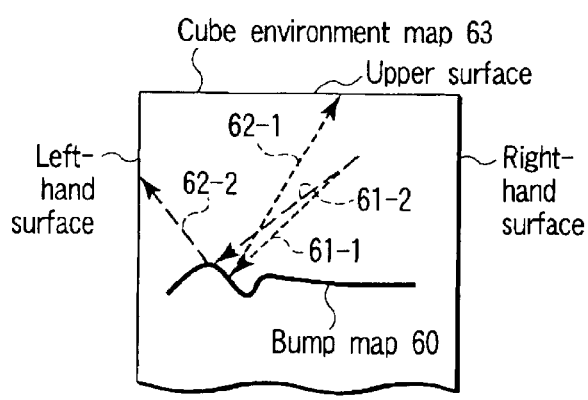
F I G. 11A
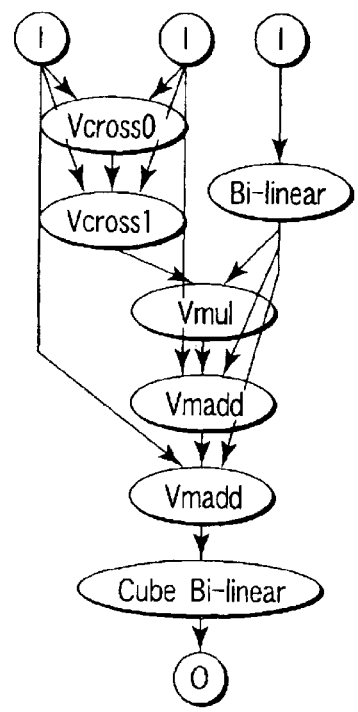
F I G. 11B

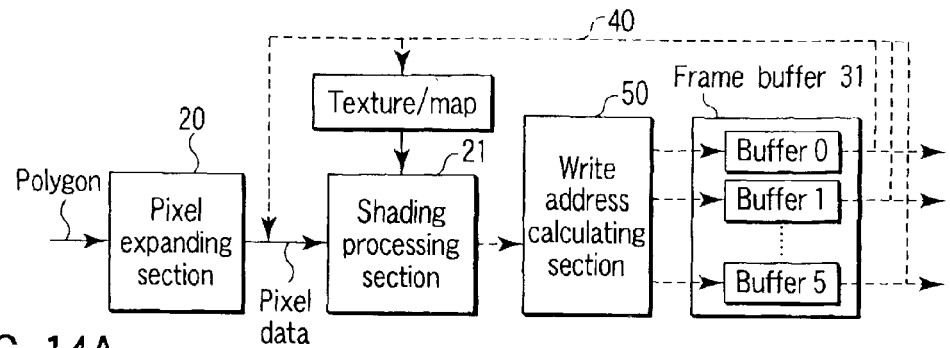
F I G. 14A
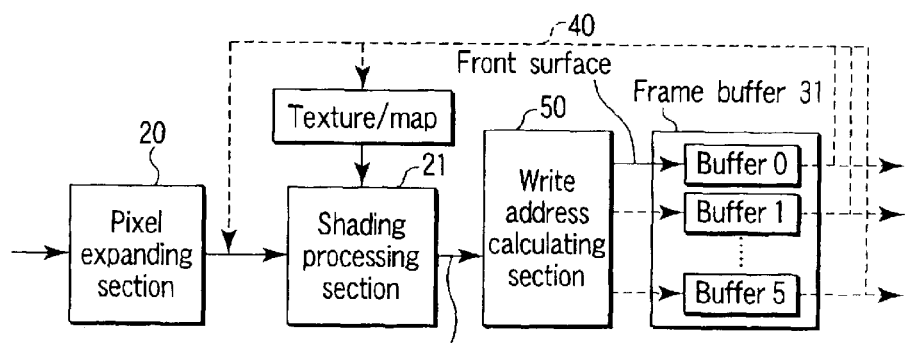
F I G. 14B
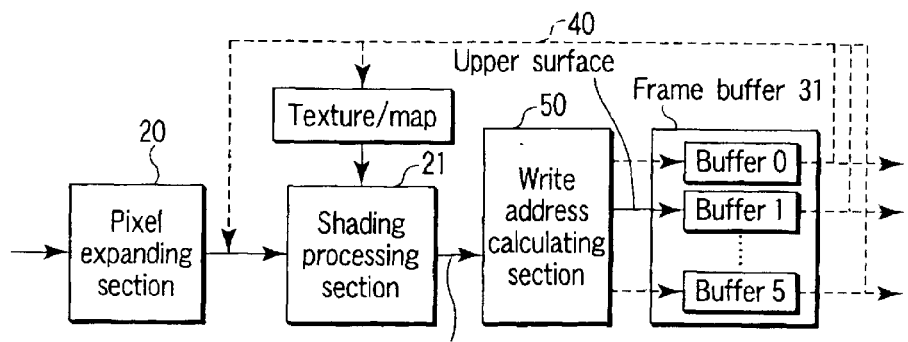
F I G. 14C
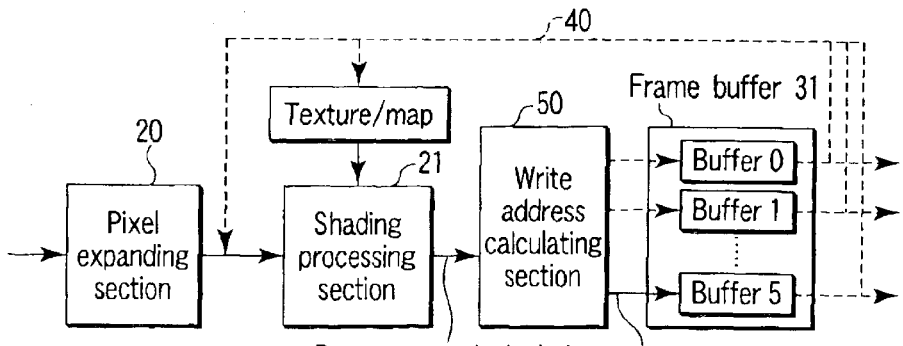
F I G. 14D

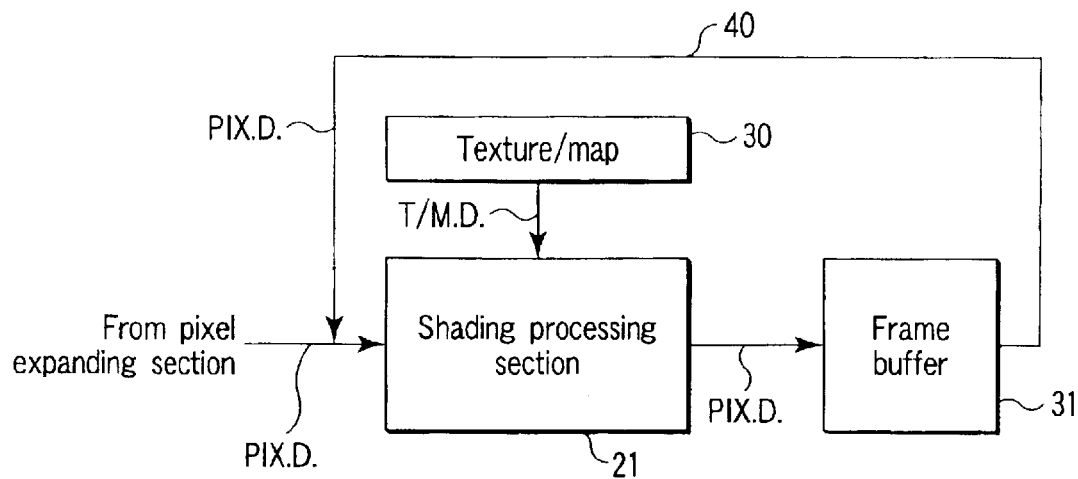
F I G. 24A
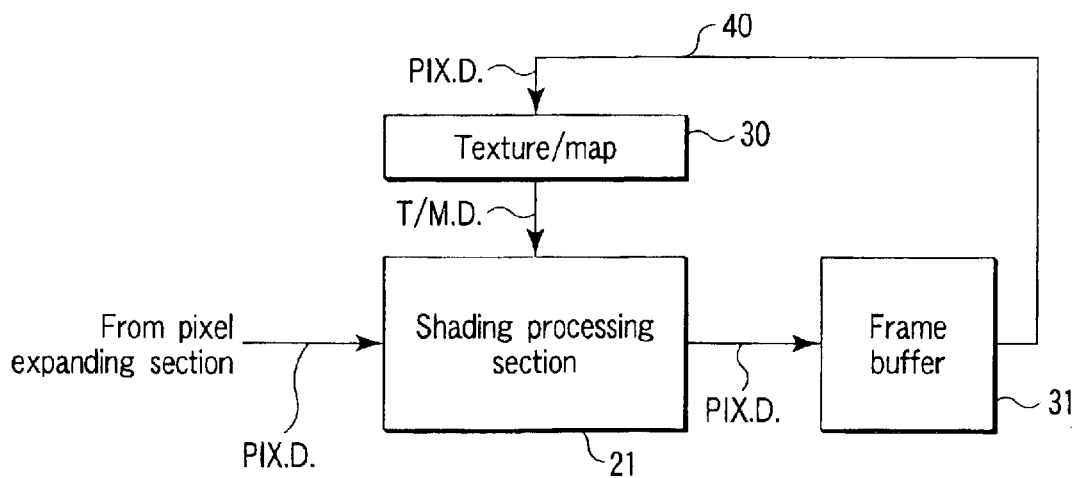
F I G. 24B

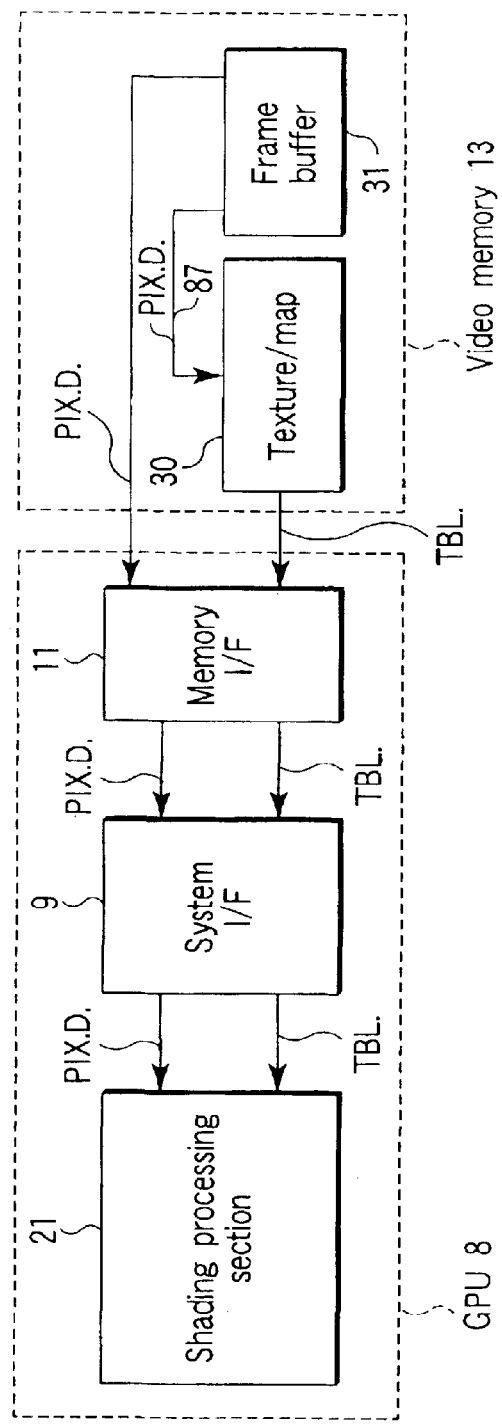
F I G. 25A
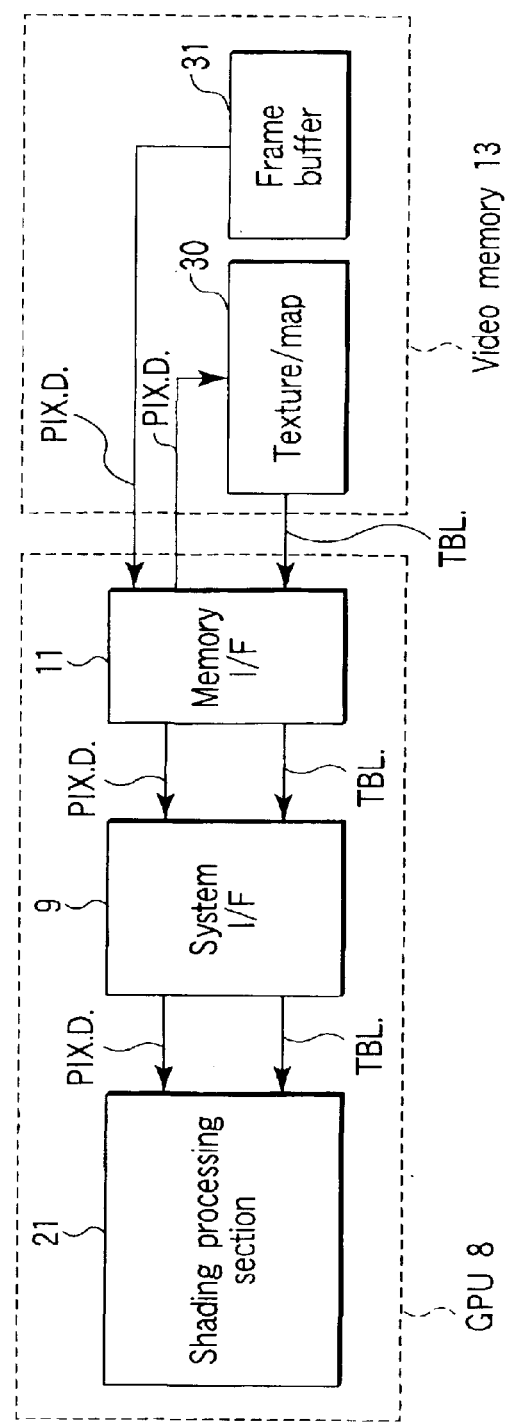
F I G. 25B

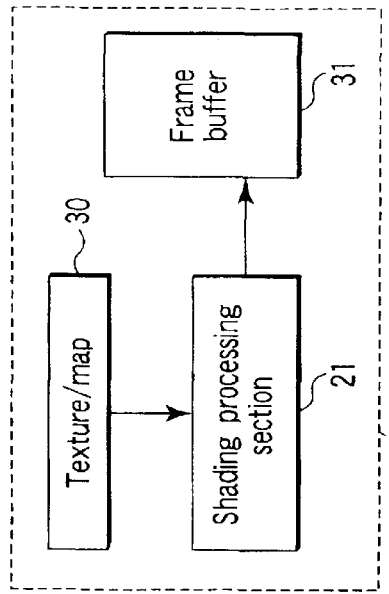
F I G. 26B
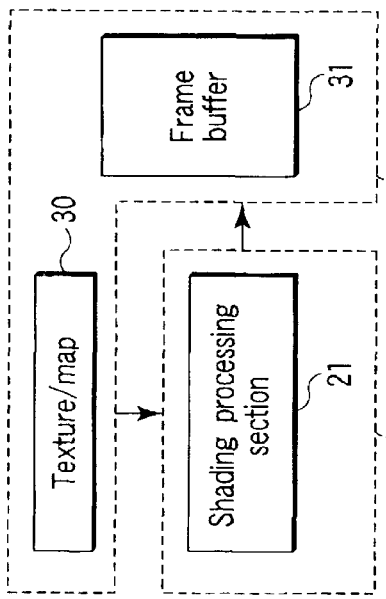
F I G. 26A
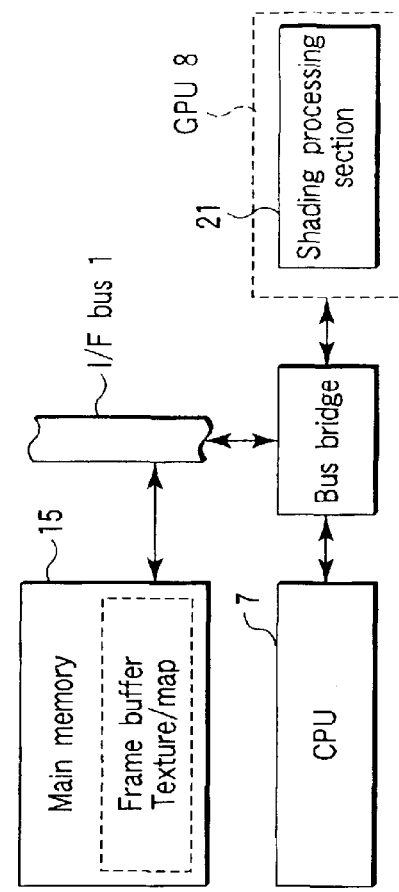
F I G. 26D
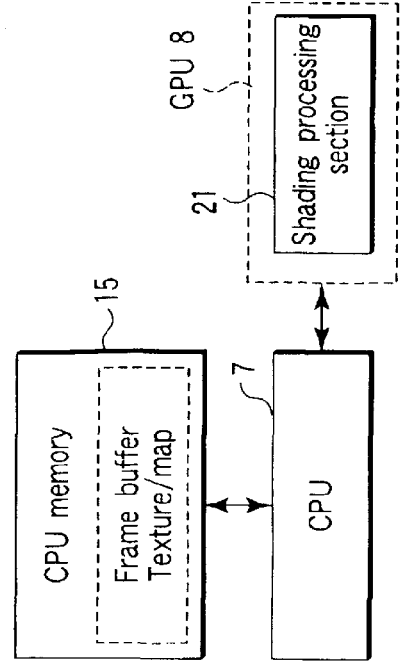
F I G. 26C

GRAPHICS PROCESSOR, GRAPHICS CARD AND GRAPHICS PROCESSING SYSTEM

CROSS-REFERENCE TO RELATED APPLICATIONS

This application is based upon and claims the benefit of priority from the prior Japanese Patent Application No. 2003-113188, filed Apr. 17, 2003, the entire contents of which are incorporated herein by reference.

BACKGROUND OF THE INVENTION

1. Field of the Invention

This invention relates to a graphics processor, and a graphics card and graphics processing system using the graphics processor.

2. Description of the Related Art

A realistic feeling for computer graphics such as three-dimensional graphics is improved year after year.

In order to improve the realistic feeling for the graphics, it is necessary to increase the number of tables of maps and textures to be mapped on the surface of a model and enlarge the size of each table. An example of mapping a plurality of textures on a pixel is disclosed in U.S. Pat. No. 6,181,352 and U.S. Pat. No. 6,333,744.

Further, in order to improve the realistic feeling, it is necessary to make a large-scale calculation by use of a large number of large tables.

BRIEF SUMMARY OF THE INVENTION

A graphics processor according to a first aspect of the present invention comprises a shading processing section which subjects pixel data to a shading process; a first path which permits map data and texture data output from a video memory to be input to the shading processing section; a second path which permits pixel data output from the shading processing section to be output to the video memory; and a third path which permits pixel data output from a pixel expanding section to be input to the shading processing section; and a fourth path which permits pixel data output from the video memory to be input to the shading processing section.

A graphics processor according to a second aspect of the present invention comprises a shading processing section which subjects pixel data to a shading process; a first path which permits map data and texture data output from a video memory to be input to the shading processing section; a second path which permits pixel data output from the shading processing section to be output to the video memory; and a write address calculating section which calculates a write address of pixel data output from the shading processing section with respect to the video memory according to write address calculation information.

A graphics card according to a third aspect of the present invention comprises a first connector which can be connected to an electronic device; a pixel expanding section which receives image display data via the first connector and expands the image display data into pixels to create pixel data; a shading processing section which subjects the pixel data to a shading process; a video memory; a first path which permits map data and texture data output from the video memory to be input to the shading processing section; a second path which permits pixel data output from the shading processing section to be output to the video memory; a third path which permits pixel data output from the pixel expanding section to be input to the shading processing section; a fourth path which permits pixel data output from the video memory to be input to the shading processing section; a D/A converter which converts a screen image output from the video memory into a video signal; and a second connector which can connect an output of the D/A converter to a display unit.

A graphics card according to a fourth aspect of the present invention comprises a first connector which can be connected to an electronic device; a pixel expanding section which receives image display data via the first connector and expands the image display data into pixels to create pixel data; a shading processing section which subjects the pixel data to a shading process; a video memory; a first path which permits map data and texture data output from the video memory to be input to the shading processing section; a second path which permits pixel data output from the shading processing section to be output to the video memory; a write address calculating section which calculates a write address of pixel data output from the shading processing section with respect to the video memory according to write address calculation information; a D/A converter which converts a screen image output from the video memory into a video signal; and a second connector which can connect an output of the D/A converter to a display unit.

A graphics processing system according to a fifth aspect of the present invention comprises an interface bus which can be connected to a peripheral device; a CPU; a bus bridge connected to the interface bus and CPU; a pixel expanding section which receives image display data via the bus bridge and expands the image display data into pixels to create pixel data; a shading processing section which subjects the pixel data to a shading process; a video memory; a first path which permits map data and texture data output from the video memory to be input to the shading processing section; a second path which permits pixel data output from the shading processing section to be output to the video memory; a third path which permits pixel data output from the pixel expanding section to be input to the shading processing section; a fourth oath which permits pixel data output from the video memory to be input to the shading processing section; and a DIA converter which converts pixel data output from the video memory into a video signal.

A graphics processing system according to a sixth aspect of the present invention comprises an interface bus which can be connected to a peripheral device; a CPU; a bus bridge connected to the interface bus and CPU; a pixel expanding section which receives image display data via the bus bridge and expands the image display data into pixels to create pixel data; a shading processing section which subjects the pixel data to a shading process; a video memory; a first path which permits map data and texture data output from the video memory to be input to the shading processing section; a second path which permits pixel data output from the shading processing section to be output to the video memory; a write address calculating section which calculates a write address of pixel data output from the shading processing section with respect to the video memory according to write address calculation information; and a D/A converter which converts pixel data output from the video memory into a video signal.

BRIEF DESCRIPTION OF THE SEVERAL VIEWS OF THE DRAWING

FIGS. 5A to 5E are diagrams showing the operations of the graphics processor and video memory according to the first embodiment of the present invention, FIG. 10 is a block diagram showing the graphics processor and video memory according to the third embodiment of the present invention, FIG. 11A is a diagram showing the relation between a bump map, sightline vector, reflection vector and cube environment map and FIG. 11B is a diagram showing the procedure of a shading process using the bump map and cube environment map, FIGS. 14A to 14D are diagrams showing one example of the operations of the graphics processor and video memory according to the third embodiment of the present invention, FIG. 25A is a block diagram showing one example of a graphics processor and video memory according to a sixth embodiment of the present invention and FIG. 25B is a block diagram showing another example of the graphics processor and video memory according to the sixth embodiment of the present invention, and FIGS. 26A to 26D are diagrams showing modifications of the first to sixth embodiments.

DETAILED DESCRIPTION OF THE INVENTION

There will now be described embodiments of this invention with reference to the accompanying drawings. In the following explanation, common portions throughout the whole drawings are denoted by the same reference symbols.

(First Embodiment)

Before explaining the first embodiment, a graphics processor according to a reference example is explained.

Figure 1A:
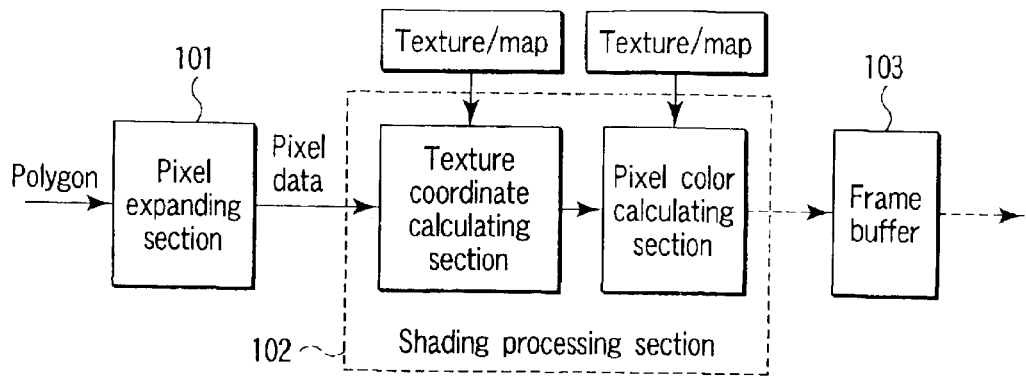
FIGS. 1A to 1C are diagrams showing the operation of a graphics processor according to a reference example of a first embodiment of the present invention.
Figure 1B:
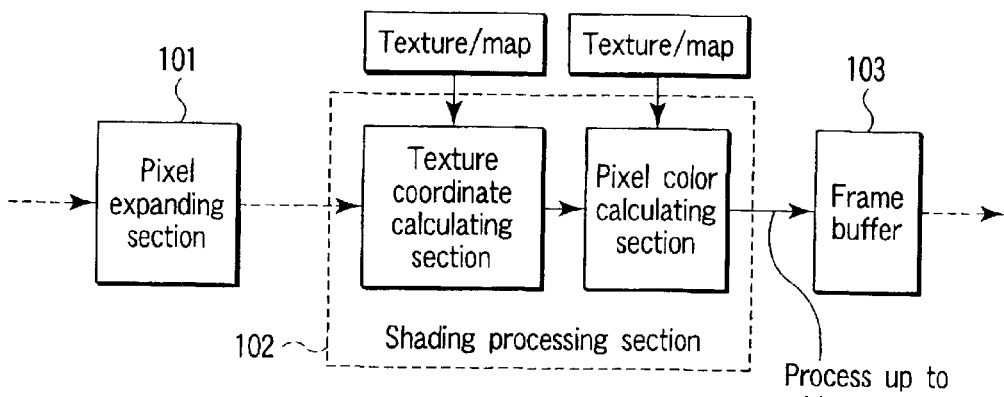
Figure 1C:
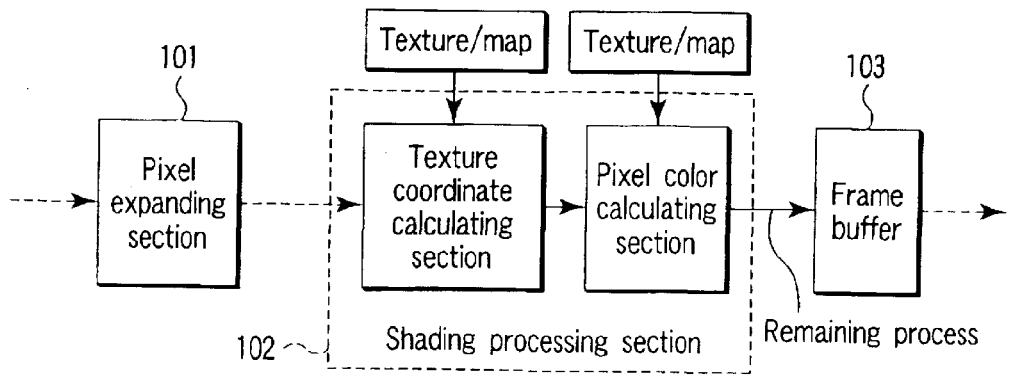

FIGS. 1A to 1C are diagrams showing the operation of the graphics processor according to the reference example of the first embodiment of the present invention.

When the pixel drawing process is accompanied by a complicated process, resources of a calculating process and a table drawing process in a shading processing section will become insufficient in some cases. In this case, the shading process is performed by use of a multi-path.

For example, as shown in FIG. 1A, a polygon is input to a pixel expanding section 101 which in turn expands the polygon into pixel data. Then, the expanded pixel data is input to a shading processing section 102 to subject the pixel data to the shading process and draw pixels. In the course of drawing, if the resources of the shading processing section 102 become insufficient, the expanding state in the course of the shading process is written into a frame buffer 103 and the shading processing section 102 is made vacant (FIG. 1B). After this, the remaining shading process is performed and the result thereof is written into the frame buffer 103 (FIG. 1C). In this case, a one-dimensional FIFO buffer is used as the frame buffer 103.

In the case of the complicated process which cannot be performed at one time, the shading process is performed in plural separated processes as in the reference example.

The first embodiment relates to a graphics processor which can enhance the processing speed and calculation ability even in the case of the complicated process which cannot be performed at one time.

Figure 2:
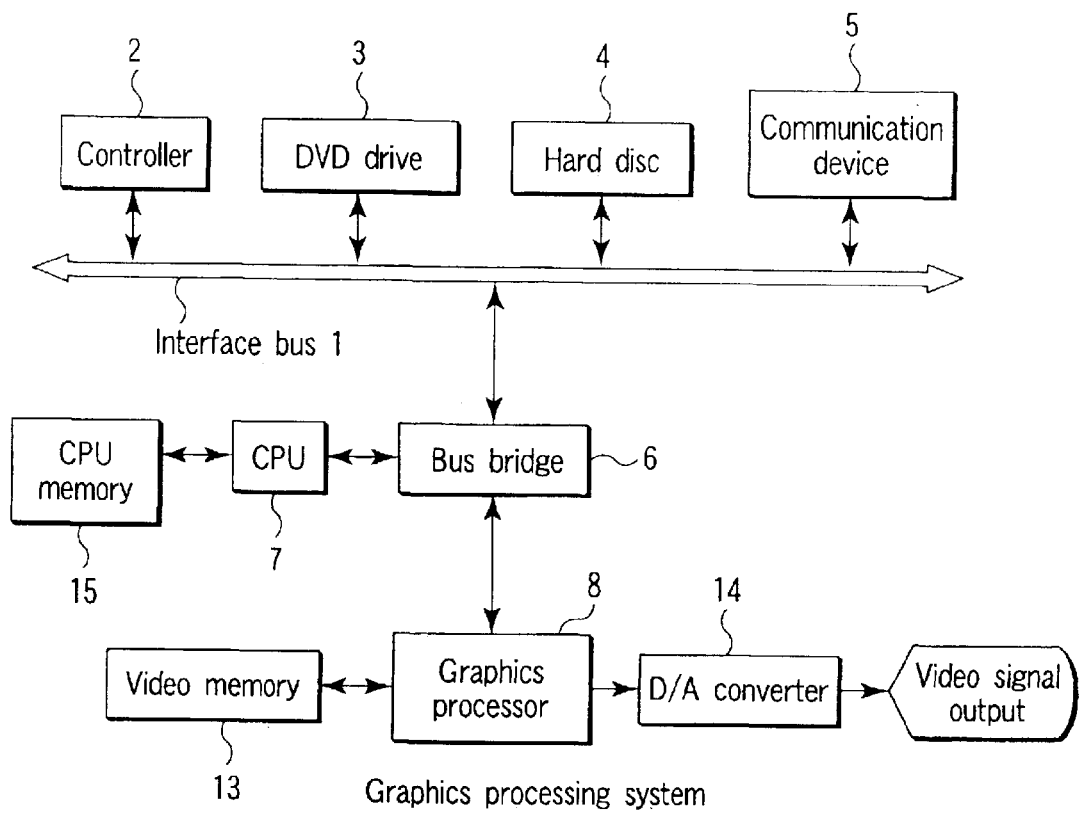
FIG. 2 is a block diagram showing one example of a graphics processing system to which the present invention is applied.

FIG. 2 is a block diagram showing one example of a graphics processing system to which the present invention is applied.

As shown in FIG. 2, peripheral devices such as a controller 2, DVD drive 3, hard disc 4 and communication device 5 are connected to an interface bus (which is hereinafter referred to as an I/F bus) 1. Further, the I/F bus 1 is connected to a bus bridge 6. The bus bridge 6 is connected to a CPU 7 and graphics processor (which is hereinafter referred to as a GPU) 8. The bus bridge 6 selects connection between the I/F bus 1 and the CPU 7, connection between the I/F bus 1 and the GPU 8 or connection between the CPU 7 and the GPU 8. For example, the I/F bus 1 is connected to the CPU 7 when information output to the I/F bus 1 is information to be transmitted to the CPU 7 and information output to the CPU 7 is information to be transmitted to the I/F bus 1. Further, the I/F bus 1 is connected to the GPU 8 when information output to the I/F bus 1 is information to be transmitted to the GPU 8 and information output to the GPU 8 is information to be transmitted to the I/F bus 1. In addition, the CPU 7 is connected to the GPU 8 when information output to the CPU 7 is information to be transmitted to the GPU 8 and information output to the GPU 8 is information to be transmitted to the CPU 7.

Figure 3:
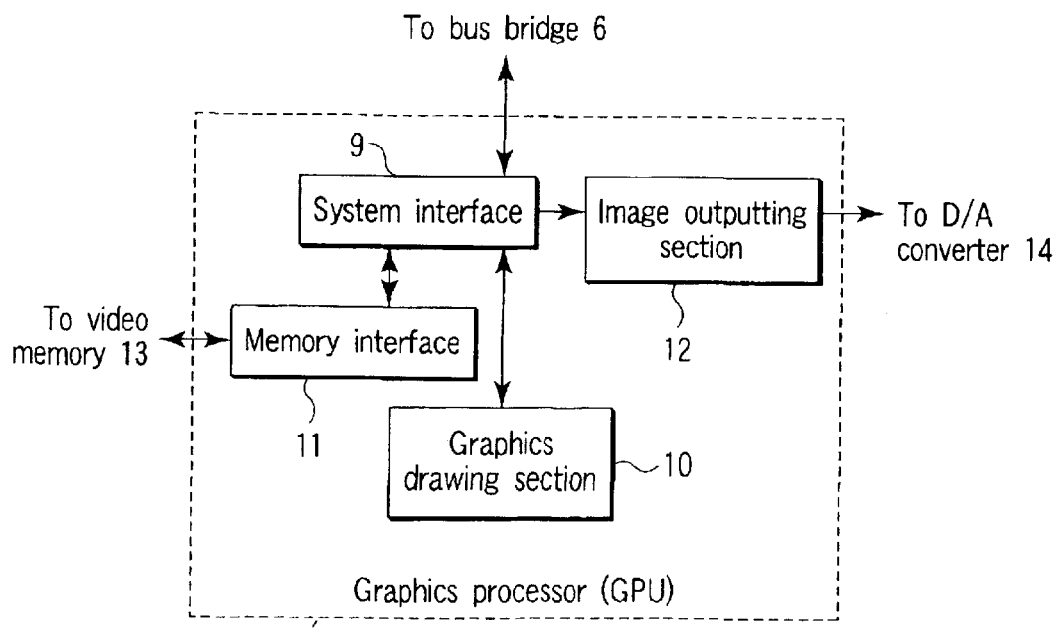
FIG. 3 is a block diagram showing one example of the graphics processor.

FIG. 3 is a block diagram showing one example of the GPU.

As shown in FIG. 3, the GPU 8 includes a system interface (which is hereinafter referred to as a system I/F) 9, graphics drawing section 10, memory interface (which is hereinafter referred to as a memory I/F) 11 and image outputting section 12. Information from the bus bridge 6 is input to the graphics drawing section 10 via the system I/F 9. The graphics drawing section 10 receives information from the bus bridge 6, for example, image display data such as a polygon from the CPU 7, expands the polygon into pixel data, subjects the expanded pixel data to a shading process and writes the resultant data into a video memory 13 via the system I/F 9 and memory I/F 11. The video memory 13 includes a texture memory 30 which stores texture data and map data and a frame buffer 31 into which an output from the graphics drawing section 10 is written as a screen image, for example. The texture data and map data from the texture memory 30 are input to the graphics drawing section 10 via the memory I/F 11 and system I/F 9 and used to perform the shading process for the pixel. The screen image output from the frame buffer 31 is input to a D/A converter 14 via the memory I/F 11, system I/F 9 and image outputting section 12. The D/A converter 14 converts an output from the frame buffer into an analog signal and outputs the thus obtained signal as a video signal output. The video signal output is input to a display unit (not shown).

The graphics processing system and GPU are shown as one example and the configurations thereof are not limited to those shown in FIGS. 2 and 3.

Figure 4:
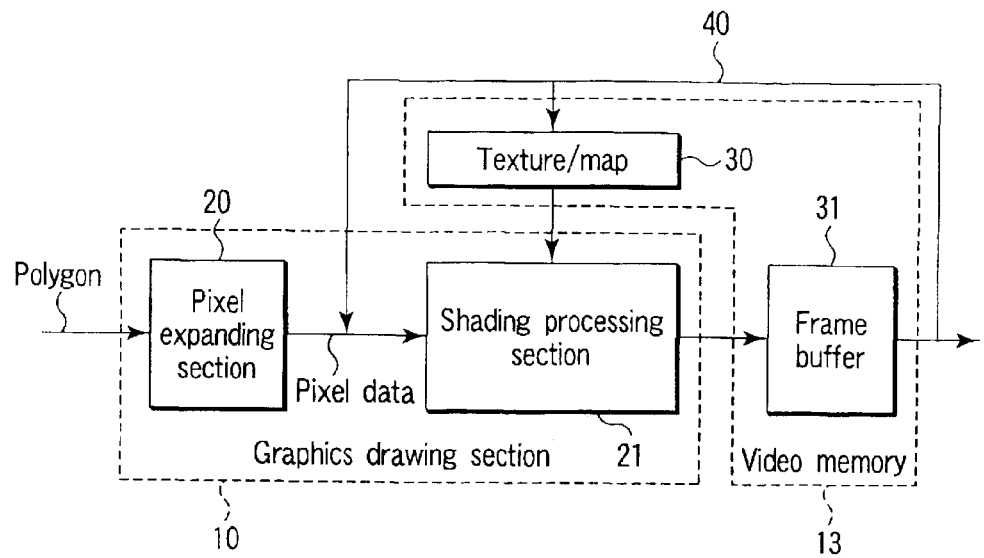
FIG. 4 is a block diagram showing the graphics processor and video memory according to the first embodiment of the present invention.

FIG. 4 is a block diagram showing the GPU and video memory according to the first embodiment of the present invention.

As shown in FIG. 4, the graphics drawing section 10 of the GPU 8 of the present example includes a pixel expanding section 20 and shading processing section 21. For example, the pixel expanding section 20 receives a polygon output from the I/F bus 1 or CPU 7 via the system I/F 9 and expands the polygon into pixel data. The thus expanded pixel data is input to the shading processing section 21. The shading processing section 21 subjects the pixel to the shading process based on the texture data and map data output from the texture memory 30. An output of the shading processing section 21 is written into the frame buffer 31. Further, in this example, a path 40 is provided which permits an output of the frame buffer 31 to be input to the shading processing section 21 and texture memory 30 without passing through the pixel expanding section 20.

Next, one example of the operation of the above configuration is explained.

FIGS. 5A to 5E are diagrams showing examples of the operations of the GPU and video memory according to the first embodiment of the present invention.

First, as shown in FIG. 5A, for example, image display data such as a polygon output from the CPU 7 is input to the pixel expanding section 20. The pixel expanding section 20 expands the polygon into pixel data. Then, the expanded pixel data is input to the shading processing section 21. After this, whether the pixel data indicates a pixel to be drawn or not is determined. The determination is made in the shading processing section 21, for example.

Next, as shown in FIG. 5B, pixel data which is determined to indicate "a pixel to be drawn" is output from the shading processing section 21 and written into the frame buffer 31. Pixel data which is determined to indicate "a pixel which is not necessary to be drawn" is not output. One example of determination whether pixel data indicates a pixel to be drawn or not is made based on whether or not a pixel can be observed from a view point position when the pixel data is displayed on a screen. Pixel data for a pixel which is determined "to be observed from the view point position" may be written into the frame buffer 31.

Next, as shown in FIG. 5C, pixel data written into the frame buffer 31 is read out and input to the shading processing section 21 again. Then, the shading processing section 21 reads out a corresponding table from the texture memory 30 based on re-input pixel data, subjects the pixel to the shading process and draws the pixel.

Next, as shown in FIG. 5D, shaded pixel data is output from the shading processing section 21 and written into the frame buffer 31 as a screen image, for example. As shown in FIG. 5E, the screen image is read out from the frame buffer 31 and input to the D/A converter 14 via the memory I/F 11, system I/F 9 and image outputting section 12. The D/A converter 14 converts the screen image into a video signal and inputs the video signal to the display unit. The display unit displays a screen image based on the video signal.

Thus, in the first embodiment, before starting the shading process, whether the pixel data indicates a pixel to be drawn or not is determined and the pixel data which indicates a pixel to be drawn is written into the frame buffer 31. After this, pixel data which has been written into the frame buffer 31 is read out from the frame buffer 31 and input to the shading processing section 21 again via the path 40. Therefore, the shading-processing section 21 draws only a pixel which is to be drawn and is not required to draw a pixel which is not necessary to be drawn. Thus, the number of pixels to be subjected to the shading process is reduced and, for example, the pixel drawing process can be performed at one time even if the pixel drawing process is accompanied by a complicated process which cannot be performed at one time.

According to the first embodiment, since the process can be performed at one time even when the pixel drawing process is accompanied by a complicated process, for example, the processing speed is enhanced in comparison with a case wherein the process is performed in two separate stages as in the reference example. Further, since the shading processing section 21 is not required to draw a pixel which is not necessary to be drawn, the calculation ability thereof is enhanced.

Further, according to the first embodiment, pixel data is returned from the frame buffer 31 to the shading processing section 21 without passing through the pixel expanding section 20. Therefore, no load is applied to the process performed by the circuit sections arranged in the preceding stage of the pixel expanding section 20.

In the first embodiment, the path 40 is connected not only to the shading processing section 21 but also to the texture memory 30. One example of the way of usage of the path 40 which is connected to the texture memory 30 is as follows.

For example, pixel data which is determined to indicate "a pixel to be drawn" may be subjected to the shading process to some extent in the shading processing section 21. The pixel data which is subjected to the shading process to some extent is not directly returned to the shading processing section 21 and, for example, it is returned to the shading processing section 21 via the texture memory 30.

Pixel data which is not subjected to the drawing process is the same as pixel data output from the pixel expanding section 20 and, for example, the pixel data can be returned to the output of the pixel expanding section 20 and can be directly returned to the shading processing section 21 via the output of the pixel expanding section 20. However, pixel data which has been subjected to the drawing process to some extent is not the same as pixel data output from the pixel expanding section 20 and if the pixel data is directly returned to the shading processing section 21 via the output of the pixel expanding section 20, a problem of data mismatching may occur. The above problem can be solved by inputting pixel data which has been subjected to the drawing process to some extent to the texture memory 30 and returning the pixel data to the shading processing section 21 via the output of the texture memory 30 without directly returning the pixel data to the shading processing section 21.

The advantage obtained by previously subjecting the pixel data which is determined to indicate "a pixel data to be drawn" to the shading process to some extent is that the shading processing time can be reduced in comparison with a case wherein the pixel data is input again without being subjected to the shading process.

(Second Embodiment)

Generally, a pixel expanding section 20 has a hard-wired configuration. If the pixel expanding section 20 has a hard-wired configuration, the drawing process can be performed only by one expanding method. The second embodiment shows a GPU in which the pixel expanding section 20 has a hard-wired configuration and the drawing process can be performed by use of a plurality of expanding methods even if the pixel expanding section 20 does not support a plurality of expanding methods.

Figure 6:
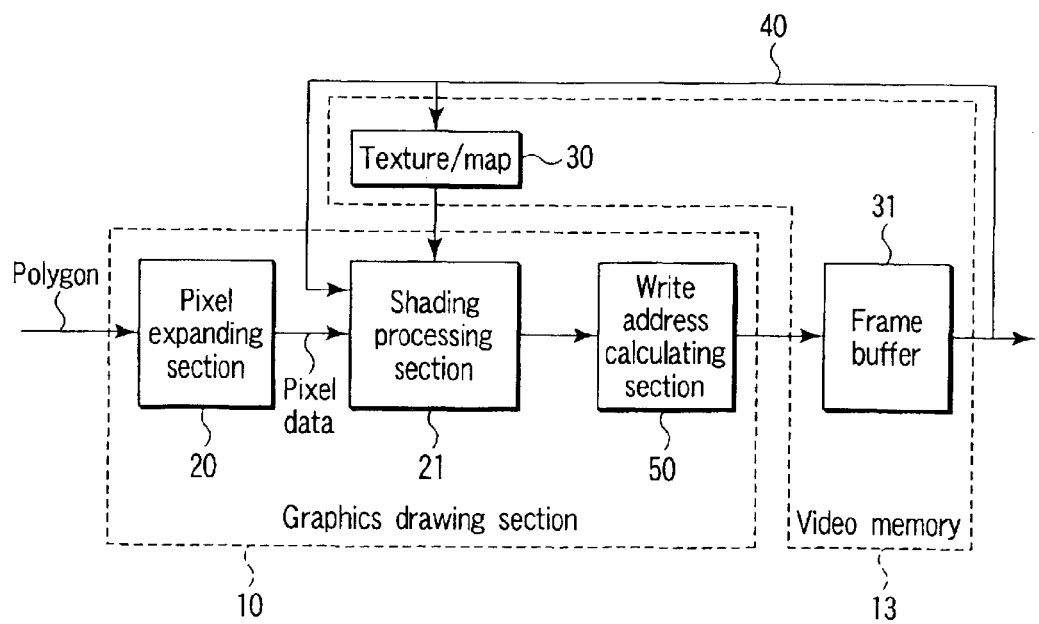
FIG. 6 is a block diagram showing a graphics processor and video memory according to a second embodiment of the present invention.

FIG. 6 is a block diagram showing the GPU and video memory according to the second embodiment of the present invention.

As shown in FIG. 6, particularly, a graphics drawing section 10 of the GPU of this example further includes a write address calculating section 50 in addition to the pixel expanding section 20 and shading processing section 21.

A write address to the frame buffer 31 is generally determined according to pixel coordinate values which are determined at the time of pixel expansion in the pixel expanding section 20.

The write address calculating section 50 of the GPU according to the second embodiment determines the write address to the frame buffer 31 based on information other than the write address determined by the pixel expanding section 20.

Next, one example of the write address determining process is explained below.

Figure 7:
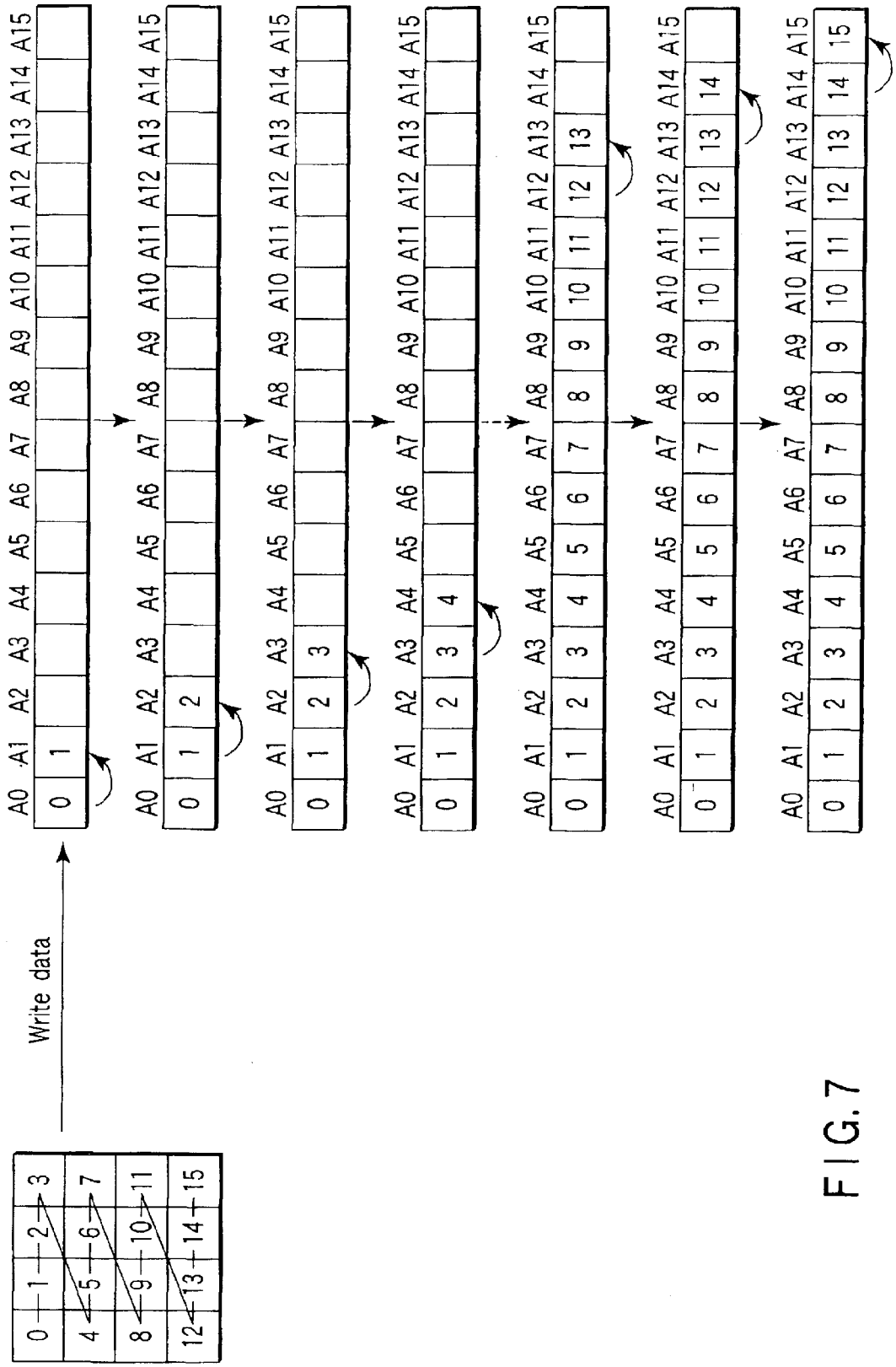
FIG. 7 is a diagram showing the relation between the order of outputting of a pixel expanding section and the order of writing into a frame buffer.
Figure 8:
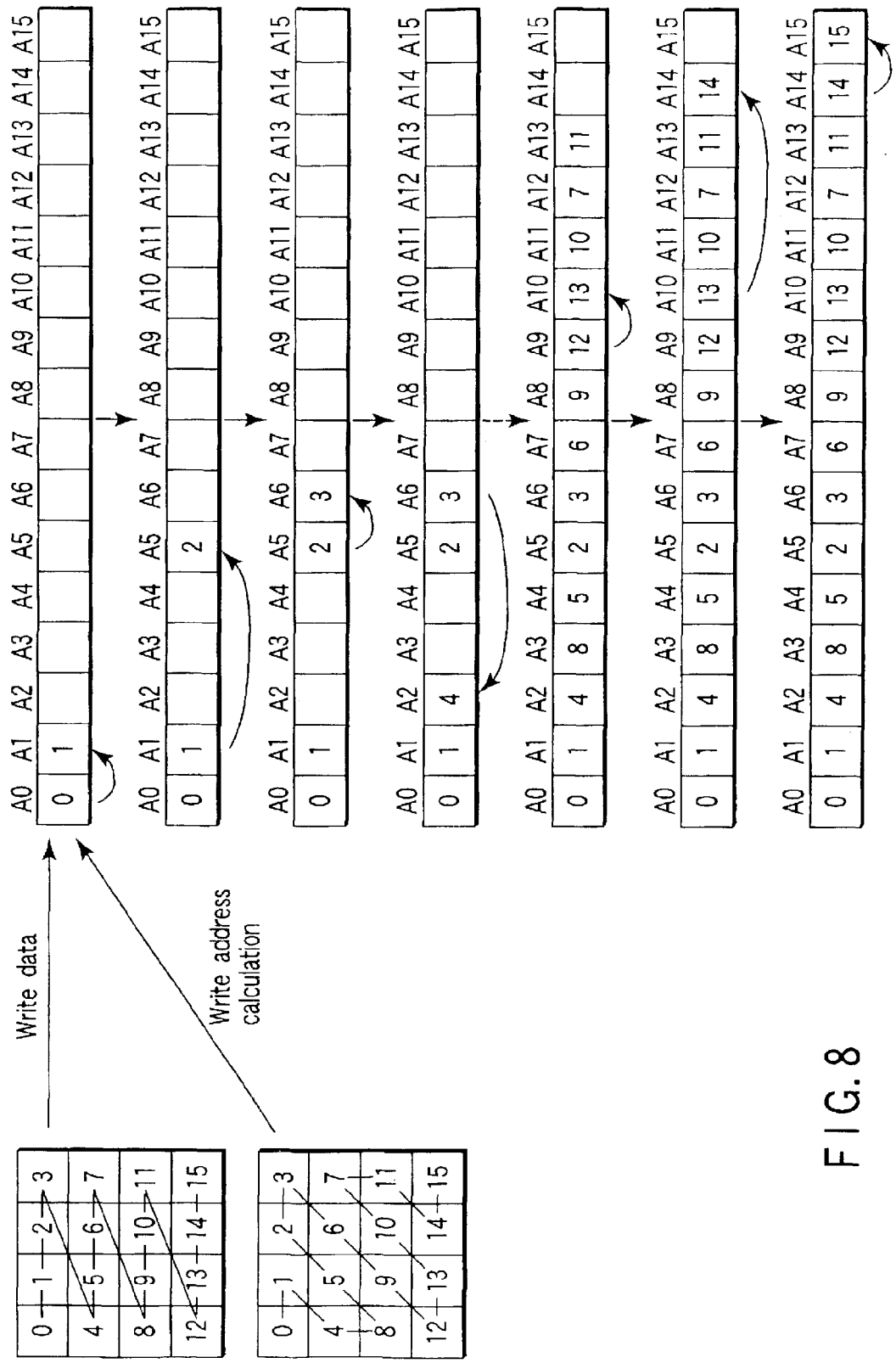
FIG. 8 is a diagram showing the relation between the order of outputting of the pixel expanding section and the order of writing into the frame buffer.

FIGS. 7 and 8 are diagrams each showing the relation between the order of outputting of the pixel expanding section and the order of writing into the frame buffer.

FIG. 7 shows a case wherein the pixel expanding section 20 expands a polygon into pixel data by use of raster scanning. For example, in the case of raster scanning, 16 pixel data items 0 to 15 are output in the order of 0, 1, 2, ..., 13, 14, 15. The write address to the frame buffer 31 is determined according to the outputting order of the raster scanning and, for example, the pixel data items 0 to 15 are sequentially stored into addresses A0 to A15 of the frame buffer 31. Readout from the frame buffer 31 is performed in the order from the address A0 towards the address A15. Thus, pixel data items are output from the frame buffer 31 in the same outputting order as that of the raster scanning.

FIG. 8 shows a case wherein the pixel expanding section 20 expands a polygon into pixel data by use of raster scanning and sets the same to correspond to zigzag scanning used in MPEG, for example.

As shown in FIG. 8, the write address calculating section 50 calculates write addresses of the pixel data items 0 to 15 with respect to the frame buffer 31 at the time of zigzag scanning. In the case of zigzag scanning, for example, 16 pixel data items 0 to 15 are output in the order of 0, 1, 4, 8, 5, 2, 3, 6, 9, 12, 13, 10, 7, 11, 14, 15. Therefore, in order to meet the above order, write address of the pixel data items 0 to 15 are calculated. Specifically, pixel data 0 is stored in the address A0, pixel data 1 is stored in the address A1, pixel data 2 is stored in the address A5, pixel data 3 is stored in the address A6, pixel data 4 is stored in the address A2, ..., pixel data 12 is stored in the address A9, pixel data 13 is stored in the address A10, pixel data 14 is stored in the address A14, and pixel data 15 is stored in the address A15. Readout from the frame buffer 31 is performed in an order from the address A0 towards the address A15. Thus, pixel data items are output from the frame buffer 31 in the same outputting order as that of the zigzag scanning.

The pixel data is returned to the shading processing section 21 by use of the path 40. The pixel data is input to the shading processing section 21 again in an order corresponding to the zigzag scanning when it is returned to the shading processing section 21. After this, the re-input pixel data is subjected to the shading process.

According to the second embodiment, for example, if the pixel expanding section 20 supports only the raster scanning and when pixel data is input to the shading processing section 21 again, the pixel data can be input in an order corresponding to the zigzag scanning. As a result, even if the pixel expanding section 20 supports only the raster scanning, the graphics drawing section 10 can perform the drawing process by use of an expanding method other than the raster scanning.

When a write address is changed by use of the write address calculating section 50, for example, address calculation information which specifies a write address or specifies a change is used. For example, the address calculation information can be input to the write address calculating section 50 from the exterior of the graphics drawing section 10. In this case, the write address calculating section 50 calculates a write address based on input address calculation information and determines a write address based on the result of calculation.

Further, the address calculation information can be contained in an output of the shading processing section 21. In this case, the write address calculating section 50 calculates a write address based on an output of the shading processing section 21 and determines a write address based on the result of calculation. For example, when address calculation information which specifies pixel expansion by zigzag scanning is contained in an output of the shading processing section 21, the write address calculating section 50 reads out address calculation information and calculates a write address which corresponds to the pixel expansion by zigzag scanning. The outputting order of the pixel data items is changed in the write address calculating section 50 so that the pixel data items will correspond to pixel expansion by zigzag scanning and the pixel data is written into the frame buffer 31.

When address calculation information is contained in an output of the shading processing section 21, the address calculation information is input to the write address calculating section 50 via a wiring which connects the shading processing section 21 to the write address calculating section 50. Therefore, it is not necessary to separately provide an input terminal which is used to input the address calculation information in the write address calculating section 50. Therefore, it is possible to attain an advantage that an increase in the circuit scale of the GPU 8 can be suppressed in comparison with a case wherein the address calculation information is acquired from a portion other than the output of the shading processing section 21.

The address calculation information may be output from a circuit other than the GPU 8, for example, from the CPU 7 or may be added by use of a circuit in the GPU 8. In a case wherein the address calculation information is output from the CPU 7, for example, the address calculation information may be contained in image display data output from the CPU 7. Alternatively, the address calculation information may be output from the CPU 7 before image display data is output from the CPU 7.

In a case wherein the address calculation information is added in the circuit inside the GPU 8, for example, the address calculation information may be added to an output of the shading processing section 21 based on the result or state of the shading process. In a case wherein the address calculation information is added in the circuit inside the GPU 8, for example, the address calculation information can be independently created by the GPU 8 based on the result or state of the shading process irrespective of information from the CPU 7. Therefore, the GPU 8 can independently change the write address and the write address changing process with high flexibility can be performed in comparison with a case wherein the address calculation information is acquired from the CPU 7.

Further, in the second embodiment, a pixel writing address is calculated after the pixel expanding process. Therefore, the write address can be changed in the pixel unit. By changing the write address in the pixel unit, the write address can be changed in a smaller unit in comparison with a case wherein the write address is changed in the object unit or polygon unit. One example of the embodiment relating to this case will be described later.

In the second embodiment, a write address of pixel data is calculated, pixel data items are rearranged according to the result of calculation, the rearranged pixel data items are returned to the shading processing section 21 and then the rearranged pixel data items are subjected to the shading process.

However, the procedure can be changed so that pixel data is subjected to the shading process, a write address of pixel data which is subjected to the shading process is calculated, and the shaded pixels are rearranged according to the result of calculation. In the case of the above procedure, it is not necessary to provide the path 40.

(Third Embodiment)

Figure 9:
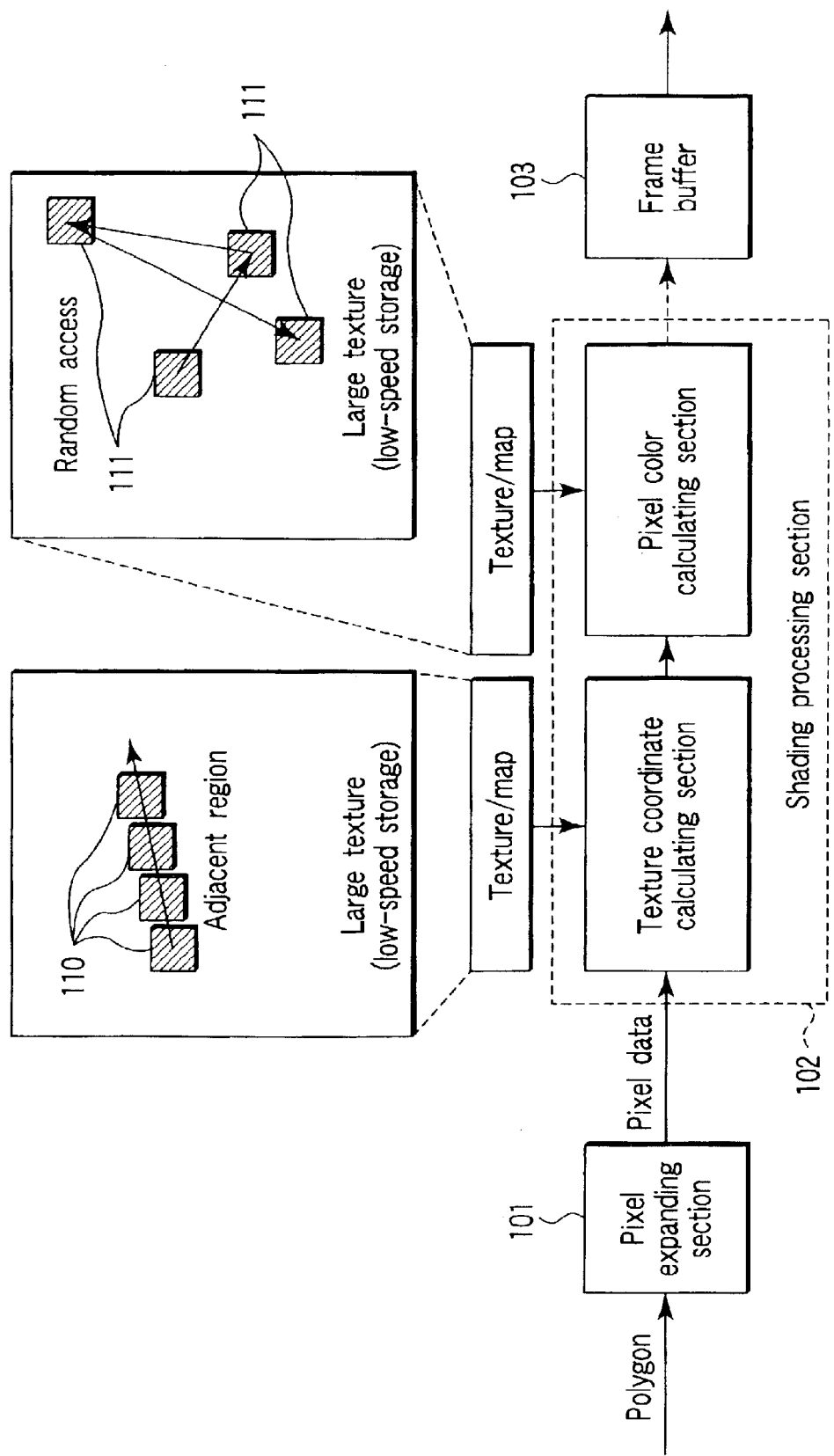
FIG. 9 is a diagram showing the operation of a graphics processor according to a reference example of a third embodiment of the present invention.

The conventional graphics processor can draw only one table with respect to one plane polygon at the time of shading process, but a recent graphics processor can draw a plurality of tables with respect to one plane polygon (FIG. 9). Further, as the realistic feeling is improved, the size of a table used becomes larger year after year and the location of a table which is next used is predicted. For example, the location of a table which is next used is predicted and the predicted table is temporarily stored in a high-speed cache memory, for example. As a result, access time used to draw a table can be reduced and the processing speed of the graphics processor can be enhanced.

However, as shown in FIG. 9, if tables 111 which are drawn depending on first tables 110 are provided, random accessibility to the tables 111 is enhanced. If the random accessibility is enhanced, it becomes difficult to predict a location to be used. When the capacity of the cache memory is small, there frequently occurs a case wherein a table to be drawn is not provided in the cache memory and must be read out from the texture memory having a lower operation speed than the cache memory. Therefore, the processing speed of the graphics processor is lowered.

Like the second embodiment, the third embodiment includes a write address calculating section 50. The write address calculating section 50 of the third embodiment calculates a write address to efficiently perform a next shading process. A write address is determined according to the result of calculation, pixels are rearranged to efficiently perform the next shading process and pixel data is written into a frame buffer 31. After this, the rearranged pixel data is returned to a shading processing section 21 to perform the next shading process.

FIG. 10 is a block diagram showing a GPU and video memory according to the third embodiment of the present invention.

In order to efficiently perform the next shading process, for example, it is only required to efficiently perform the table drawing process in the next shading process. In the third embodiment, a write address is calculated to lower the random accessibility at the time of table drawing. The write address is determined according to the result of calculation, pixels are rearranged to lower the random accessibility at the time of table drawing and pixel data is written into the frame buffer 31. After this, the rearranged pixel data is returned to the shading processing section 21 via a path 40 to perform the next shading process. The processing speed of the shading process at this time is enhanced since the table drawing process is efficiently performed. Next, one concrete example is explained below.

The example relates to a shading process using a bump map and cube environment map.

FIG. 11A is a diagram showing the relation between the bump map, sightline vector, reflection vector and cube environment map and FIG. 11B is a diagram showing the procedure of the shading process using the bump map and cube environment map.

First, as shown in FIGS. 11A and 11B, an uneven table (bump map) 60 is drawn on a plane polygon (pixel data) and reflection vectors 62-1, 62-2 of sightline vectors 61-1, 61-2 are calculated based on the shape thereof. Then, a location of a cube environment map 63 which is used to subject the pixel to the shading process is calculated based on the reflection vectors 62-1, 62-2. In this case, there occurs a possibility that locations of the cube environment map 63 will not be adjacent to each other depending on the uneven state of the bump map 60 in some cases even if adjacent regions of the bump map 60 are drawn. For example, as shown in FIG. 11A, the reflection vector 62-1 strikes against the upper surface of the cube environment map 63 of an uneven inclined surface 64 and the reflection vector 62-2 strikes against the left-hand surface of the cube environment map 63 near an uneven top 65 which is adjacent to the inclined surface 64. If the locations of the cube environment map 63 are not adjacent, it becomes necessary to perform a process of drawing a table of the upper surface of the cube environment map 63 in order to draw the inclined surface 64 and drawing a table of the left-hand surface of the cube environment map 63 in order to draw the top 65 which follows the above inclined surface. As a result, the random accessibility is increased at the time of table drawing.

Figure 12:
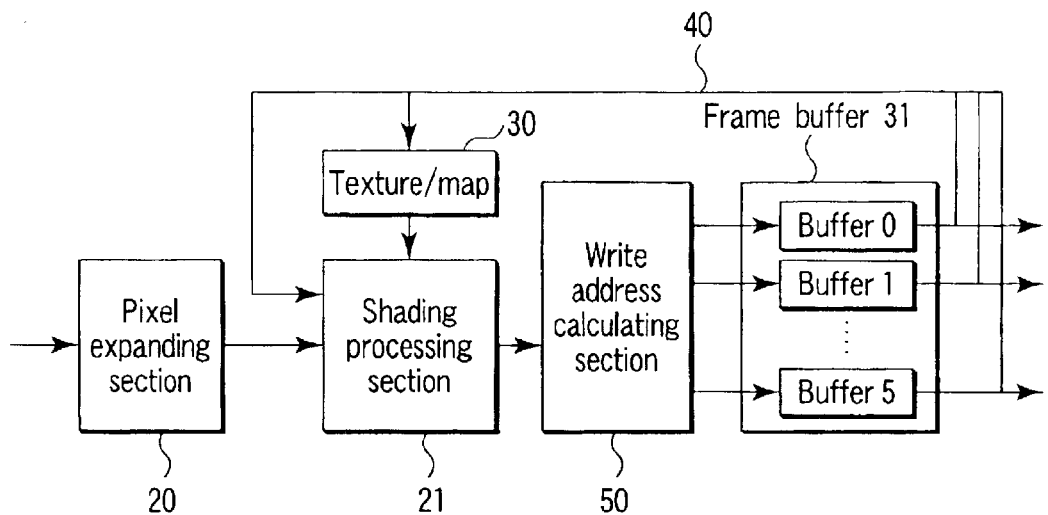
FIG. 12 is a block diagram showing a concrete example of the graphics processor and video memory according to the third embodiment of the present invention.

In order to solve the above problem, the following process is performed in the present example. FIG. 12 is a block diagram showing the GPU and video memory to perform the shading process according to the present example.

Figure 13:
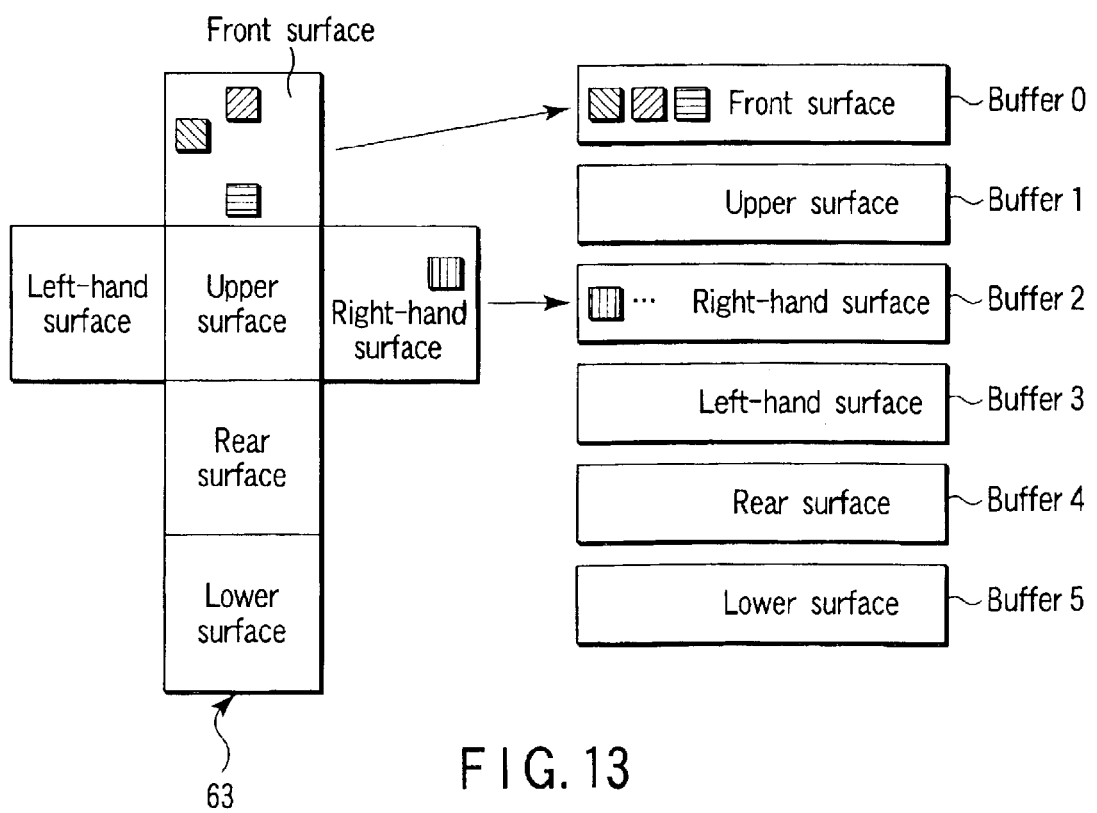
FIG. 13 is a diagram showing the relation between each surface of the cube environment map and the buffer.

As shown in FIG. 12, the frame buffer 31 of this example includes buffers 0 to k. The write address calculating section 50 calculates and determines one of the buffers 0 to k into which pixel data bump-mapped in the shading processing section 21 is written. For example, as shown in FIG. 13, the cube environment map 63 can be expanded into six surfaces of front, rear, right, left, upper and lower surfaces. One of the surfaces of the cube environment map 63 which the bump-mapped pixel data reflects is calculated by use of the bump map, sightline vector and reflection vector. The calculation is performed in the shading processing section 21. For example, the result of calculation, that is, map position information of the cube environment map is added to an output of the shading processing section 21. The write address calculating section 50 reads out map position information. The address calculating section 50 sorts bump-mapped pixel data based on the readout map position information according to the surface which the pixel reflects and writes the pixel data into one of the six buffers 0 to 5. In this example, the buffers 0 to 5 respectively correspond to the front surface, upper surface, right-hand surface, left-hand surface, rear surface and lower surface. In this example, pixel data to be written into one of the buffers 0 to 5 is data which is being subjected to the shading process and in which the bump map 60 is mapped and the cube environment map 63 is not mapped, for example. In the pixel data which is being subjected to the shading process, for example, map position information and drawing information such as screen coordinates x, y, z, coordinates and pixel colors are contained. The flow of the above process is shown in FIGS. 14A to 14D.

First, as shown in FIG. 14A, for example, image display data such as a polygon output from the CPU 7 is input to the pixel expanding section 20. The pixel expanding section 20 expands a polygon into pixel data. Then, the pixel data is input to the shading processing section 21. Next, the pixel is subjected to the shading process in the shading processing section 21. In this example, the bump map is mapped for each pixel data. At this time, as described above, the surface of the cube environment map 63 which each pixel data reflects is calculated and map position information corresponding to the result of calculation is added to an output of the shading processing section 21.

Next, as shown in FIGS. 14B to 14D, the address calculating section 50 reads out map position information added to the output of the shading processing section 21 and calculates a write address based on the readout map position information. Then, pixel data bump-mapped according to the result of calculation is sorted into the front surface, upper surface, right-hand surface, left-hand surface, rear surface and lower surface and written into one of the six buffers 0 to 5.

The flow of the process after the end of the write process is shown in FIGS. 15A to 15D.

Figure 15A:
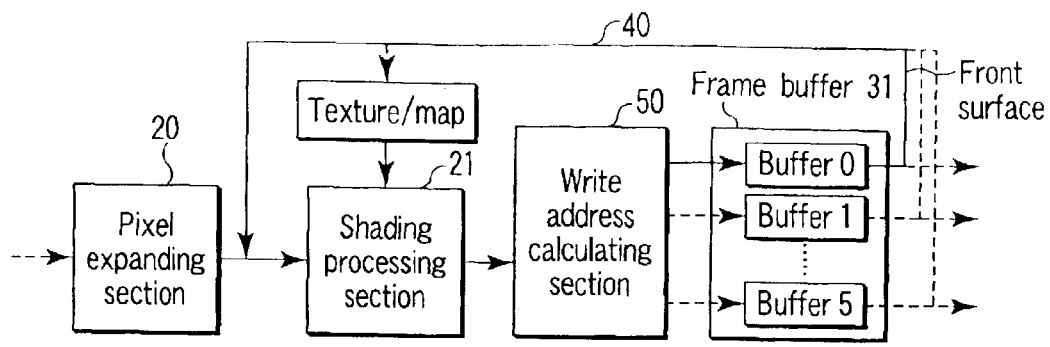
FIGS. 15A to 15D are diagrams showing one example of the operations of the graphics processor and video memory according to the third embodiment of the present invention.

First, as shown in FIG. 15A, for example, bump-mapped pixel data is read out from the buffer 0 and the readout pixel data is input to the shading processing section 21 via the path 40. Then, a table corresponding to the front surface of the cube environment map is read out from the texture memory 30, information of the front surface described on the table is mapped into pixels in the shading processing section 21 and pixel data thus obtained is written into the frame buffer 31 via the write address calculating section 50. In this example, the information is written into the buffer 0 of the frame buffer 31, for example.

Figure 15B:
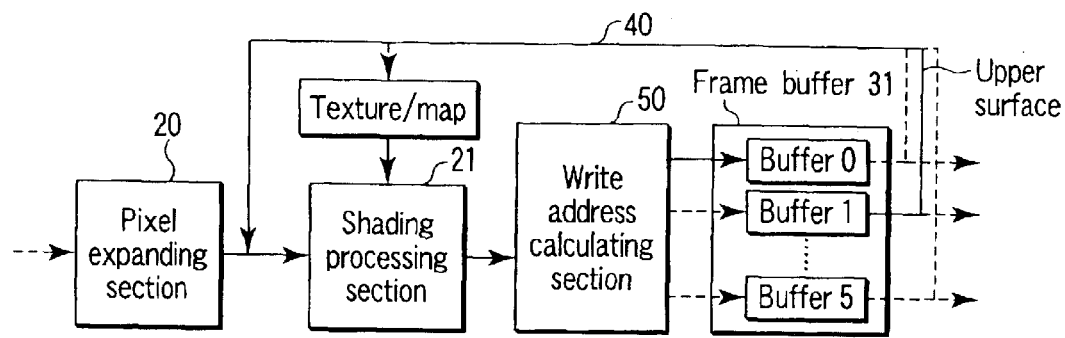

After the front surface mapping process is terminated, as shown in FIG. 15B, for example, bump-mapped pixel data is read out from the buffer 1 and the readout pixel data is input to the shading processing section 21 via the path 40. Then, a table corresponding to the upper surface of the cube environment map is read out from the texture memory 30, information of the upper surface described on the table is mapped into pixels in the shading processing section 21 and pixel data thus obtained is written into the frame buffer 31 via the write address calculating section 50. In this example, the information is written into the buffer 0 of the frame buffer 31, for example.

Figure 15C:
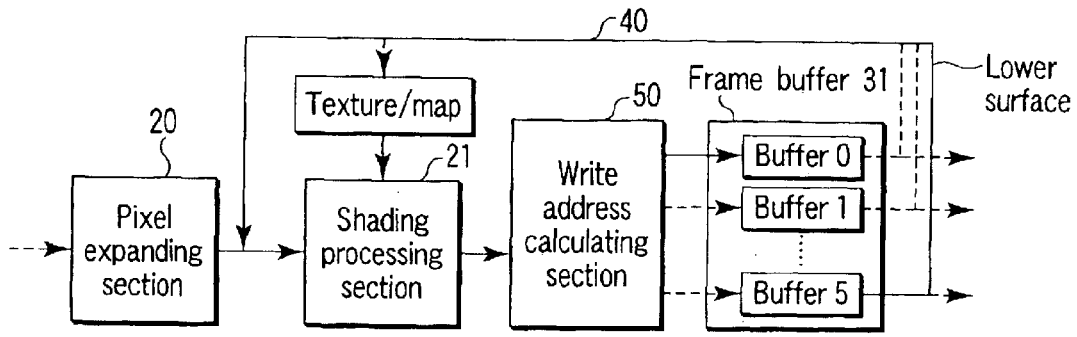

As shown in FIG. 15C, the above operation is repeatedly performed until information is written into the buffer 5.

In this case, the write address calculating section 50 may restore pixel data distributed for each surface of the cube environment map into a form so as to cope with the pixel expanding system, for example, and write the pixel data into the frame buffer 31. At this time, the pixel data which is environment-mapped may be written into one buffer. In this example, the pixel data is written into the buffer 0.

Figure 15D:
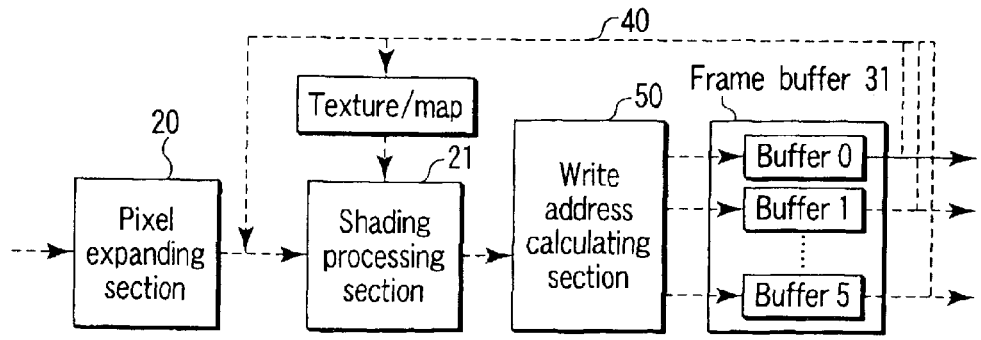

Next, as shown in FIG. 15D, the written pixel data is read out from the frame buffer 31 as a screen image, for example.

In this example, since pixel data is distributed according to the front surface, upper surface, right-hand surface, left-hand surface, rear surface and lower surface of the cube environment map, a possibility that a table to be drawn is changed in a random fashion from the front surface directly to the lower surface, for example, at the time of table drawing of the cube environment map can be suppressed.

Figure 16A:
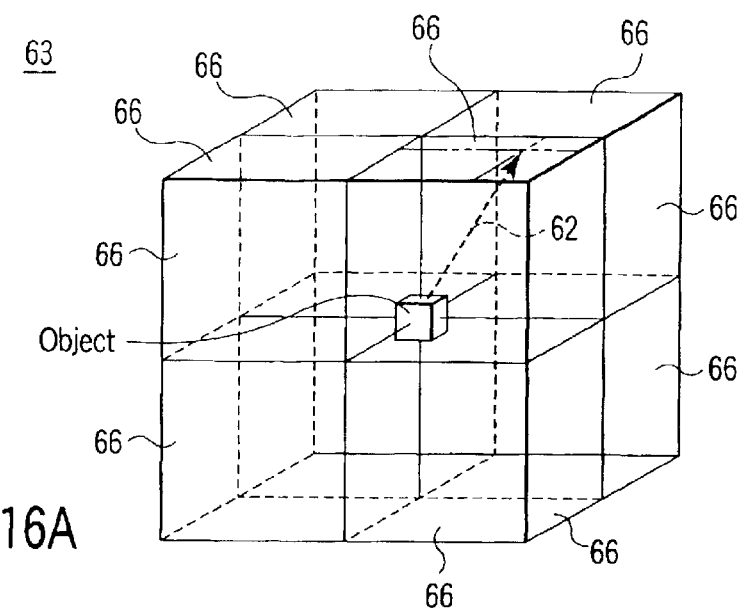
FIG. 16A is a diagram showing a cube environment map and FIG. 16B is a diagram showing a sphere environment map.

In the third embodiment, the buffers 0 to 5 are allocated to the six surfaces of the front surface, upper surface, right-hand surface, left-hand surface, rear surface and lower surface of the cube environment map 63. However, if the maps of the respective surfaces of the cube environment map 63 are large, each surface can be divided into plural blocks, for example, four blocks 66 as shown in FIG. 16A. In this case, four blocks×six surfaces=24 blocks 66 can be acquired. The 24 blocks 66 can be respectively assigned to 24 buffers 0 to 23. Of course, the number of divided blocks can be freely selected.

Figure 16B:
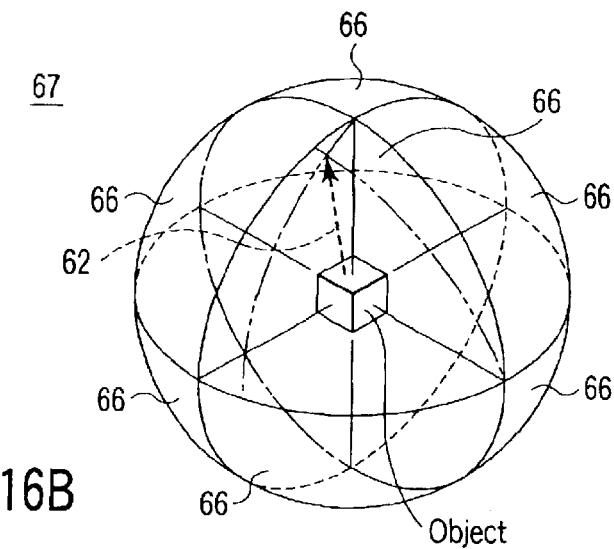

In the third embodiment, the cube environment map is shown as an example of the environment map, but the environment map is not limited to the cube environment map. For example, it can be applied to a sphere environment map 67 as shown in FIG. 16B. In the example shown in FIG. 16B, the sphere environment map 67 is divided into four blocks in each of the upper and lower portions, that is, eight blocks 66 in total. The third embodiment can be applied to the sphere environment map 67 by respectively allocating the eight blocks 88 to eight buffers 0 to 7. Of course, in the sphere environment map 67, the number of divided blocks can be freely selected.

As described, according to the third embodiment, the random accessibility can be reduced when a table of the environment map is drawn in a next shading process, for example.

(Fourth Embodiment)

The fourth embodiment relates to a method of drawing objects in a perspective representation and improving a realistic feeling for graphics.

Figure 17A:
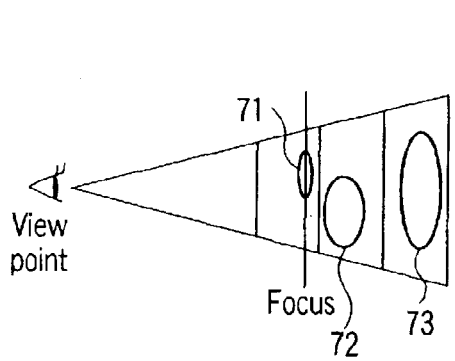
FIG. 17A is a diagram showing objects having different depths and FIG. 17B is a diagram showing objects having different depths as viewed from a view point.
Figure 17B:
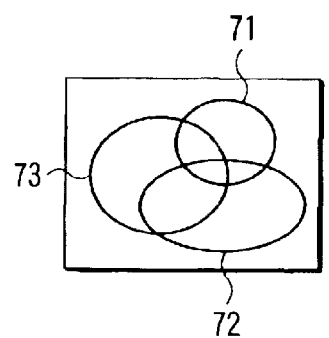

In FIG. 17A, three objects 71, 72, 73 having different depths are shown. In this example, the object 71 lies nearest to the view point and the objects 72, 73 become farther apart from the view point in this order. FIG. 17B is a diagram showing the objects 71, 72, 73 as viewed from the view point. In FIG. 17B, the state in which the objects 71, 72, 73 are not gradated is visualized. In this state, the perspective representation or a difference in the depth of the objects 71, 72, 73 cannot be observed. In order to express the objects in the perspective representation, the following process is performed for the objects 71, 72, 73, for example.

Figure 18A:
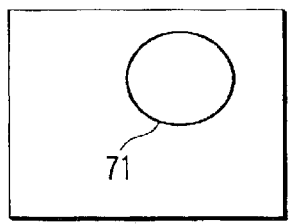
FIGS. 18A to 18C are diagrams showing objects separately arranged for the respective depths.
Figure 18B:
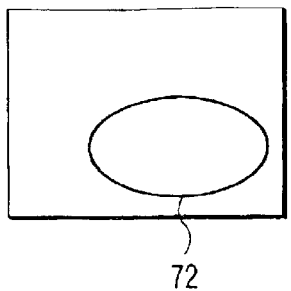
Figure 18C:
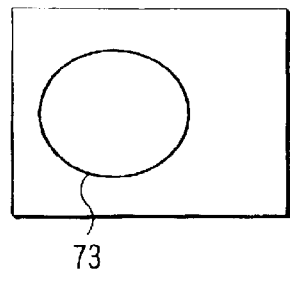

The depths of the objects 71, 72, 73, for example, the distances thereto from the view point are calculated and then the objects 71, 72, 73 are separately arranged for the respective depths as shown in FIGS. 18A to 18C. The separately arranging process is performed based on a program and processed in the CPU 7, for example. After this, the objects 71, 72, 73 which are separately arranged for the respective depths are sequentially input to the GPU 8 in an order of being farther apart from the view point and drawn.

Figure 19A:
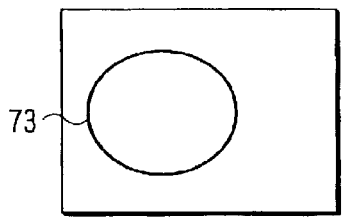
FIGS. 19A to 19G are diagrams showing the drawing procedure of a graphics processor according to a reference example of a fourth embodiment of the present invention.
Figure 19B:
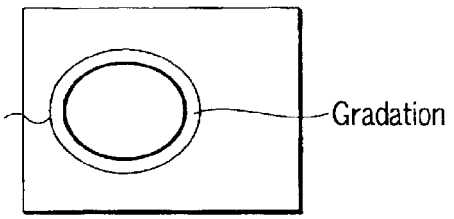

First, as shown in FIG. 19A, the object 73 which lies in the farthest position from the view point is drawn. Then, if the drawing process for a certain range, for example, the entire portion of the object 73 is terminated, a filter corresponding to the depth of the object 73, for example, a deviation from the view point or focus is applied to the object 73 to gradate the object 73 as shown in FIG. 19B.

Figure 19C:
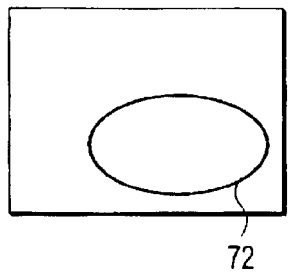
Figure 19D:
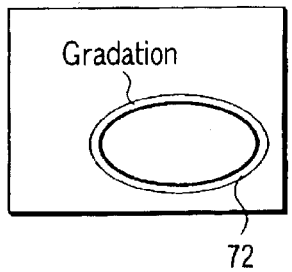
Figure 19E:
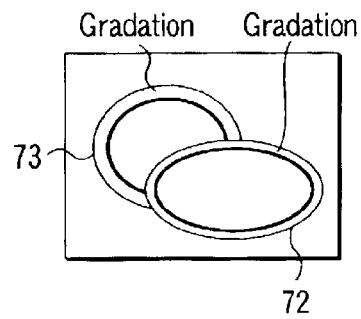

Next, as shown in FIG. 19C, the object 72 which lies in the next farthest position from the view point is drawn in the same manner as in the above case. Then, if the drawing process for the entire portion of the object 72 is terminated, for example, a filter corresponding to a deviation from the view point or focus, for example, is applied to the object 72 to gradate the object 72 as shown in FIG. 19D. After this, the object 72 is merged with the gradated object 73 as shown in FIG. 19E.

Figure 19F:
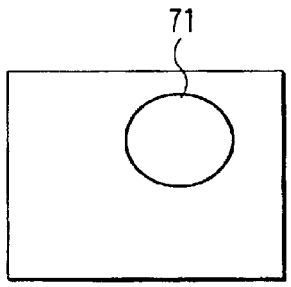
Figure 19G:
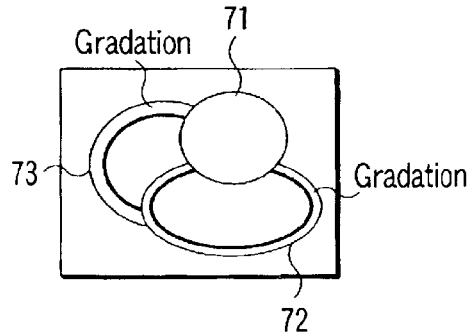

Next, as shown in FIG. 19F, the object 71 which lies in the nearest position to the view point is drawn. Then, if the drawing process for the entire portion of the object 71 is terminated, for example, the object 71 is merged with the shaded objects 72, 73 as shown in FIG. 19G. In this case, the focus is adjusted on the object 71. For example, it is not necessary to gradate the focused object.

Figure 20A:
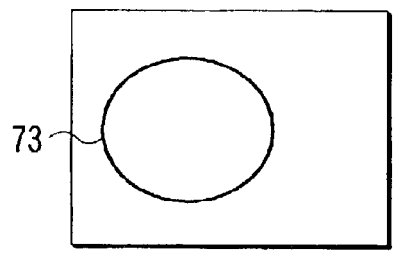
FIGS. 20A to 20F are diagrams showing the drawing procedure of a graphics processor according to another reference example of the fourth embodiment of the present invention.
Figure 20B:
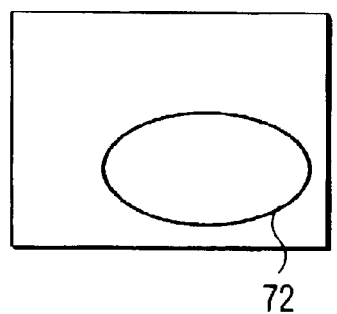
Figure 20C:
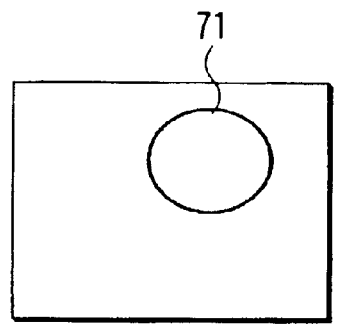
Figure 20D:
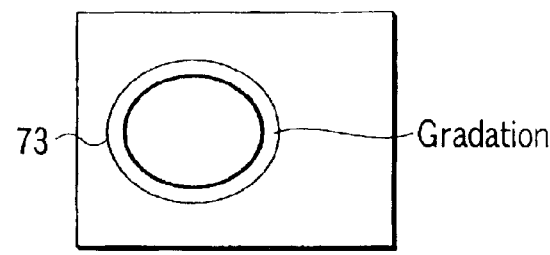
Figure 20E:
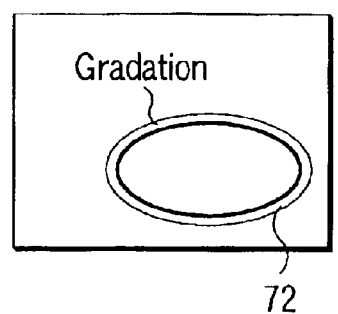
Figure 20F:
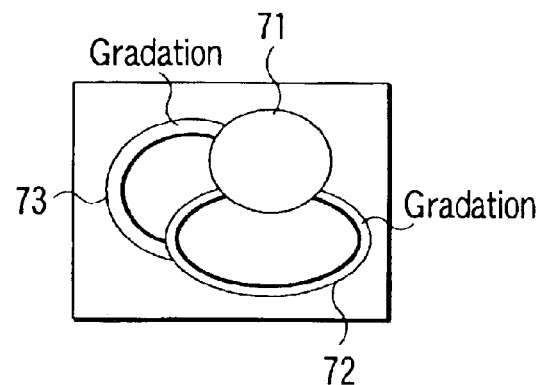

Further, as shown in FIGS. 20A to 20C, the objects 71, 72, 73 which are separately arranged for the respective depths by use of a program are sequentially drawn and respectively written into the different buffers. Next, as shown in FIGS. 20D, 20E, the objects 72, 73 which are deviated from the focus are gradated according to the amounts of deviations from the view point or focus by use of the respective buffers, for example. After this, as shown in FIG. 20E, the object 71 is merged with the gradated objects 72, 73.

By thus performing the above process, the objects 71, 72, 73 are expressed in the perspective representation and the realistic feeling for the graphics is increased.

However, the above method is a method of gradation the respective objects 71, 72, 73 or the respective polygons configuring the objects 71, 72, 73 and has a limitation in increasing the realistic feeling.

The process of separately arranging the objects 71, 72, 73 for the respective depths are performed according to the program and it is processed by use of the CPU 7, for example. Therefore, there occurs a problem that the working load of the CPU 7 is increased.

Therefore, in the fourth embodiment, the following process is performed. The outline thereof is described below. That is, the process contains a process of sorting pixel data for each surface of the cube environment map and shading the pixel data for each surface of the cube environment map in the third embodiment and a process of sorting pixel data for the respective depths and shading the pixel data for the respective depths. In the fourth embodiment, the pixel data items are merged with one another in the last stage.

Figure 21:
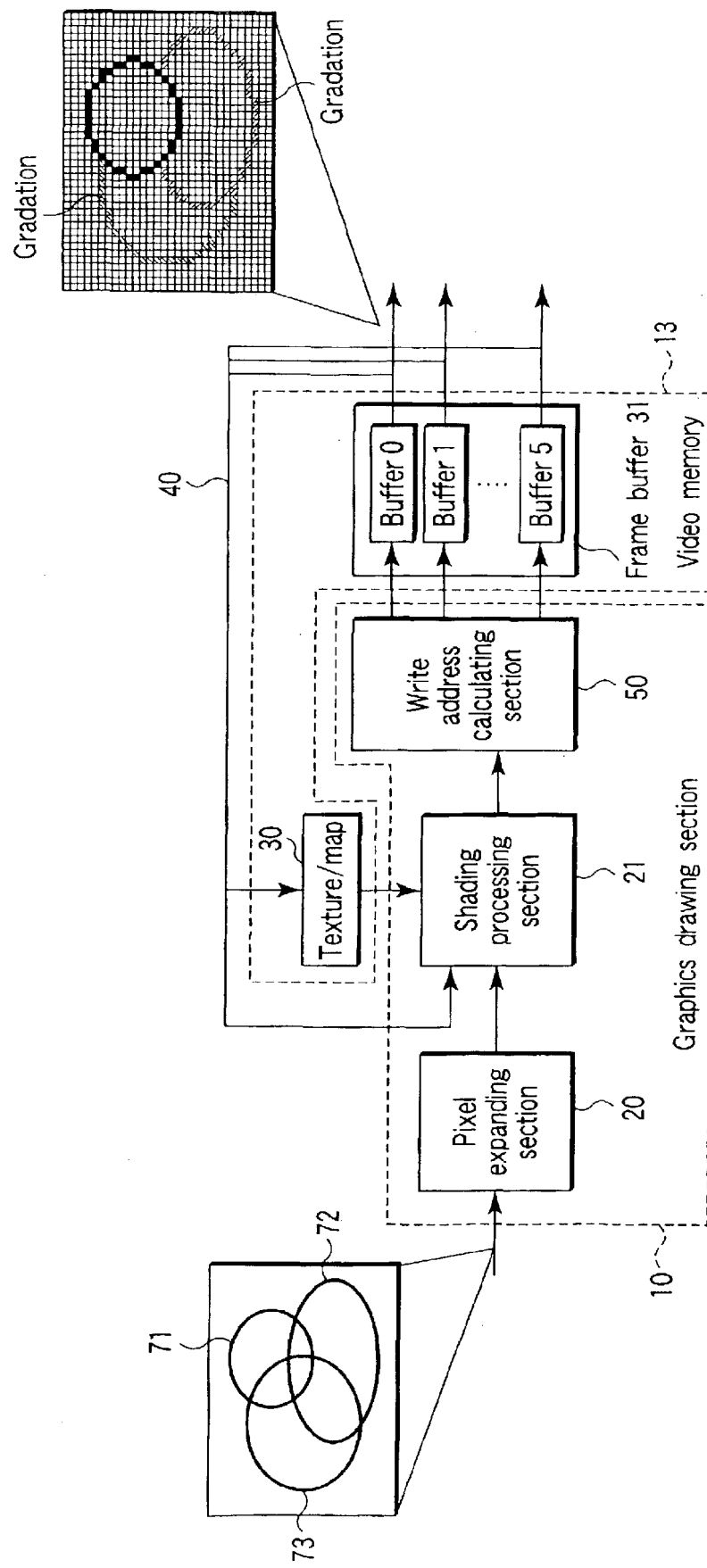
FIG. 21 is a block diagram showing the graphics processor and video memory according to the fourth embodiment of the present invention.

FIG. 21 is a block diagram showing the GPU and video memory according to the fourth embodiment of the present invention.

As shown in FIG. 21, like the third embodiment, the fourth embodiment has a write address calculating section 50 and a frame buffer 31 is divided into (k-1) buffers 0 to k.

In the fourth embodiment, the objects 71, 72, 73 are not separately arranged for the respective depths before they are input to the GPU 8. The objects 71, 72, 73 which are not separately arranged for the respective depths are directly input to a pixel expanding section 20, for example. Each of the objects 71, 72, 73 is configured by a plurality of polygons (not shown). In the plurality of polygons, drawing data and depth information are contained. The pixel expanding section 20 expands the polygon into pixel data. The pixel data is input to the shading processing section 21, subjected to the shading process and output from the shading processing section 21. The shaded pixel data is input to the write address calculating section 50. The write address calculating section 50 reads out depth information contained in the shaded pixel data, sorts the pixel data according to the depth and selectively writes the pixel data into a desired one of the buffers 0 to k.

When the write process is terminated, for example, pixel data is read out from the buffer 0 and the readout pixel data is input to the shading processing section 21 via a bus 40 and texture memory 30, for example. Then, the input pixel data is shaded according to the depth.

Next, for example, pixel data is read out from the buffer 1 and the readout pixel data is input to the shading processing section 21 via the bus 40 and texture memory 30, for example. Then, the input pixel data is gradated according to the depth.

The above operation is repeatedly performed until data for the buffer k is processed.

If the gradation process for the respective depths is terminated, each shaded pixel data is supplied to and written into the frame buffer 31 from the shading processing section 21 via the write address calculating section 50 and the pixel data items are merged with one another in the frame buffer 31. In the fourth embodiment, the gradation process for the perspective representation is performed not in the object unit or polygon unit, but in the pixel unit. Therefore, the gradation process can be changed in the pixel unit and can be more finely performed in comparison with a method in which the gradation process is changed in the object unit or polygon unit and the realistic feeling for graphics can be further increased.

In the fourth embodiment, it is not necessary to separately arrange the objects 71, 72, 73 for the respective depths before they are input to the GPU 8. Therefore, for example, the operation performed by the CPU 7 can be alleviated and the operation amount of the CPU 7 can be reduced.

When the objects 71, 72, 73 are separately arranged for the respective depths before they are input to the GPU 8, it becomes necessary to sequentially draw the separately arranged objects 71, 72, 73 one by one.

However, in the fourth embodiment, since the objects 71, 72, 73 are not separately arranged for the respective depths before they are input to the GPU 8, the objects 71, 72, 73 can be drawn at one time. Therefore, the processing speed can be enhanced in comparison with a case wherein the objects 71, 72, 73 are sequentially drawn one by one.

In the fourth embodiment, if there is no margin to provide a large number of buffers 0 to k for the respective depths in the video memory 13, it is possible to draw and shade only pixels in a certain range and repeatedly perform the drawing process and shading process while changing the drawing range.

(Fifth Embodiment)

The fifth embodiment relates to one example of a graphics card utilizing the graphics processor according to any one of the first to fourth embodiments. The graphics card is called a video card or video board, incorporated into a personal computer, for example, and used for expansion of the function of the personal computer or the like.

Figure 22:
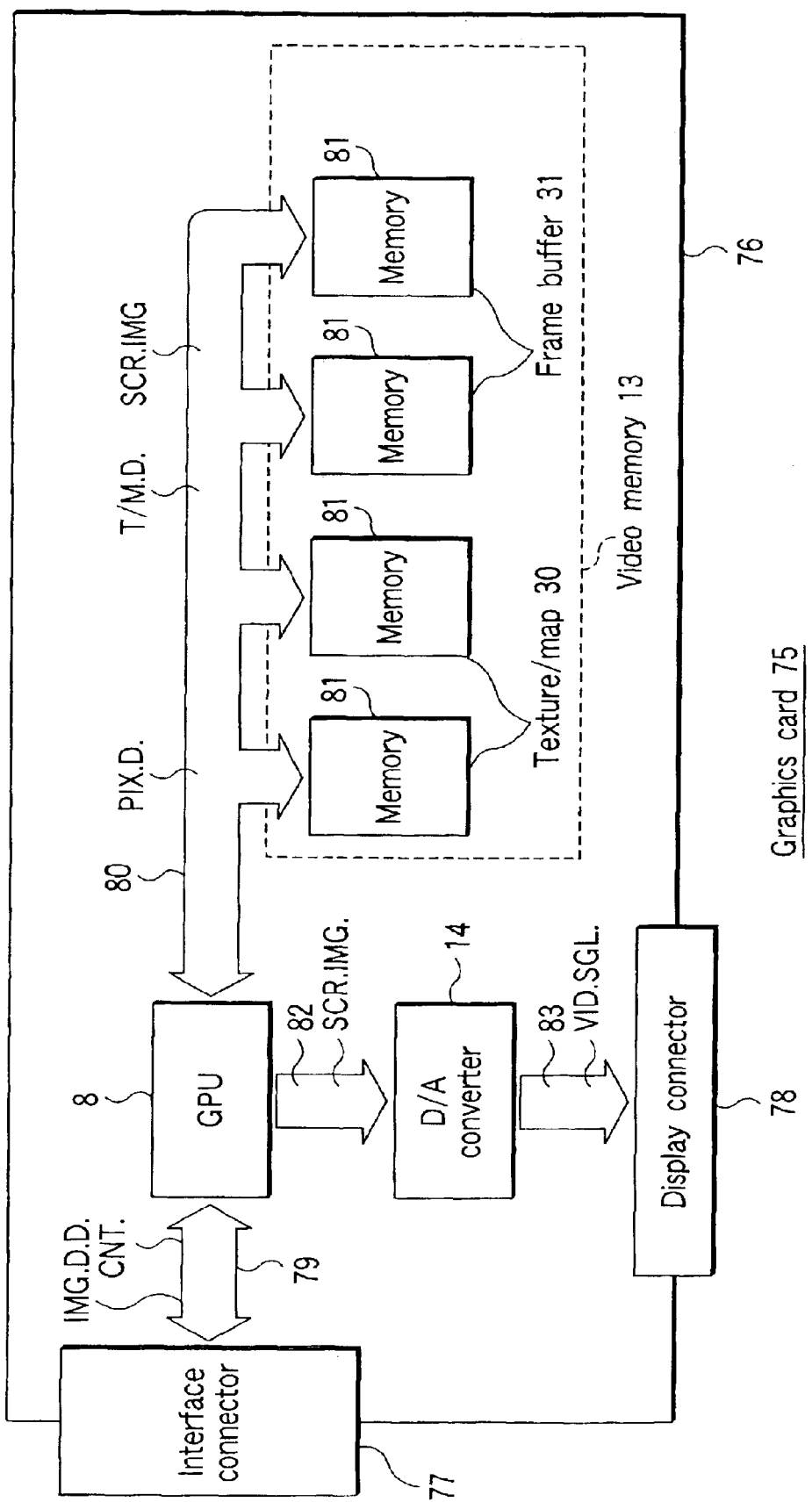
FIG. 22 is a block diagram showing one example of a graphics card according to a fifth embodiment of the present invention.

FIG. 22 is a block diagram showing one example of the graphics card according to the fifth embodiment of the present invention.

As shown in FIG. 22, a graphics card 75 has a GPU 8, video memory 13, D/A converter 14, interface connector 77 and display connector 78 arranged on a circuit board 76.

The interface connector 77 is an electrical contact which connects the card 75 to an electronic device arranged outside the card 75. For example, the interface connector 77 connects the GPU 8 to the bus bridge 6 or CPU 7 explained with reference to FIG. 2. Image display data (IMG.D.D.) such as a polygon input via the interface connector 77 is supplied to the GPU 8 via a wiring 79. A control signal (CNT) which controls the card 75 is transferred between the GPU 8 and the CPU 7 via the wiring 79, for example.

The GPU 8 is connected to the video memory 13 via a wiring 80. In this example, four memories 81 are prepared as the video memory 13 and, for example, two of the memories are used as a texture memory 30 and the remaining two memories are used as a frame memory 31. Pixel data (PIX.D.) output from the GPU 8 is input to the video memory 13 via the wiring 80. The video memory 13 outputs pixel data (PIX.D.) screen image (SCR.IMG.), and texture data and map data (T/M.D.). The data items are input to the GPU 8 via the wiring 80.

Further, the GPU 8 is connected to the D/A converter 14 via a wiring 82. The screen image (SCR.IMG.) output from the video memory 13 is input to the D/A converter 14 via the GPU 8 and wiring 82.

The D/A converter 14 is connected to the display connector 78 via a wiring 83. The display connector 78 is an electrical contact which connects the card 75 to a display unit arranged outside the card 75. The D/A converter 14 converts the screen image (SCR.IMG.) which is digital information into a video signal (VID.SGL.) which is analog information and outputs the video signal (VID.SGL.) to the display unit via the wiring 83 and display connector 78.

As the GPU 8 shown in FIG. 22, the GPU 8 explained in the first to fourth embodiments is used.

Figure 23:
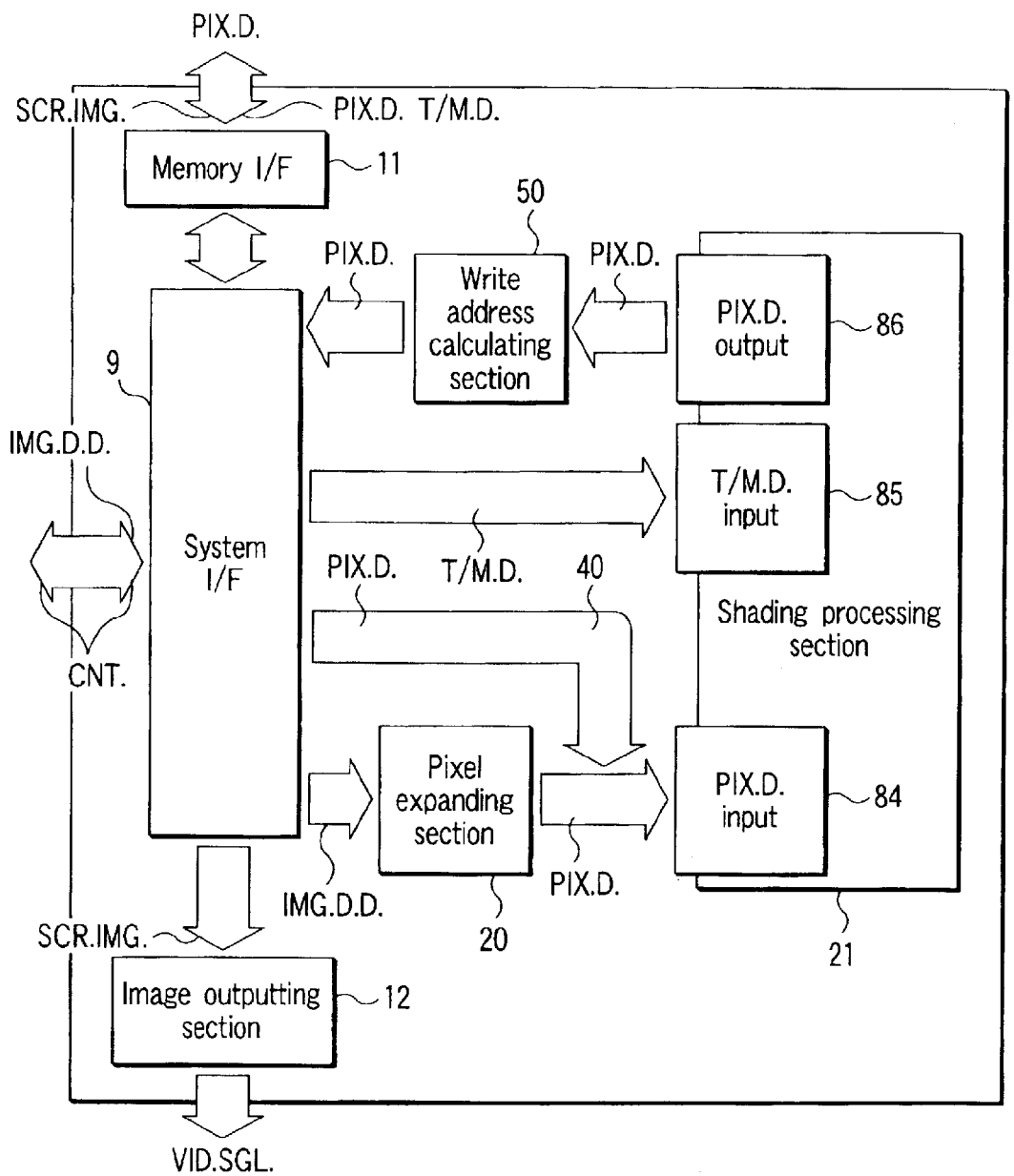
FIG. 23 is a block diagram showing one example of a GPU 8 shown in FIG. 22, FIGS. 24A and 24B are diagrams showing an inputting method of inputting pixel data to a texture memory.

FIG. 23 is a block diagram showing one example of the GPU 8 shown in FIG. 22. The GPU 8 of this example includes a path 40 and write address calculating section 50.

As shown in FIG. 23, image display data (IMG.D.D.) is input to a pixel expanding section 20 via a system I/F 9. The pixel expanding section 20 expands the image display data (IMG.D.D.) into pixels to output pixel data (PIX.D.) and inputs the pixel data to a PIX.D. input 84 of a shading processing section 21. The shading processing section 21 performs the process explained in the first to fourth embodiments, for example. After performing the process explained in the first to fourth embodiments, the shading processing section 21 outputs pixel data (PIX.D.) to the video memory 13 via a PIX.D. output 86, write address calculating section 50, system I/F 9 and memory I/F 11. For example, as explained in the second, third and fourth embodiments, if a write address to the frame buffer 31 of the video memory 13 is changed, the write address is changed in the write address calculating section 50 and then pixel data (PIX.D.) is output.

The pixel data (PIX.D.) output from the video memory 13 is input to the PIX.D. input 84 of the shading processing section 21 via the memory I/F 11, system I/F 9 and path 40. After this, the shading processing section 21 performs the process explained in the first to fourth embodiments, for example. When performing the process and, for example, if the table is used or pixel data which is now subjected to the drawing process is used as explained in the first to fourth embodiments, the shading processing section 21 receives texture data and map data (T/M.D.) and pixel data which is now subjected to the drawing process via the memory I/F 11, system I/F9 and T/M.D. input 85. After performing the process explained in the first to fourth embodiments, the shading processing section 21 outputs pixel data (PIX.D.) to the video memory 13 via the PIX.D. output 86, write address calculating section 50, system I/F 9 and memory I/F 11.

A screen image (SCR.IMG.) output from the video memory 13 is supplied to the D/A converter 14 via the memory I/F 11, system I/F 9 and image outputting section 12.

Thus, the graphics card 75 can be configured by use of the graphics processor and video memory according to the first to fourth embodiments of this invention.

(Sixth Embodiment)

FIGS. 24A and 24B are diagrams showing an inputting method of inputting pixel data to a texture memory 30.

For example, as explained in the first embodiment, when pixel data (PIX.D.) written into the frame buffer 31 is input to the texture memory 30, two methods are used: one method (FIG. 24A) is to input the pixel data to the shading processing section 21 via the path 40 and input the pixel data from the shading processing section 21 to the texture memory 30, and the other method (FIG. 24B) is to input the pixel data from the frame buffer 31 to the texture memory 30 via the path 40.

As described above, one example of usage of the two methods is that pixel data which is not subjected to the drawing process is returned to the output of the pixel expanding section 20 and is then directly returned to the shading processing section 21 via the output of the pixel expanding section 20. Further, pixel data which has been drawn to some extent is temporarily input to the texture memory 30 without being directly returned to the shading processing section 21 and is then returned to the shading processing section 21 via the output of the texture memory 30.

When pixel data is temporarily input to the texture memory 30, the following two systems are considered.

For example, if the video memory 13 is externally attached and mounted on the graphics card 75, a path 87 which connects the texture memory 30 and the frame buffer 31 of the video memory 13 to each other is newly provided as shown in FIG. 25A. Then, pixel data is input from the frame buffer 31 to the texture memory 30 via the newly provided path 87. In this case, a system of the graphics card 75 is changed.

Further, for example, if it is not desired to change the system of the graphics card 75, pixel data is first input from the frame buffer 31 to the GPU 8 and then input from the GPU 8 to the texture memory 30 as shown in FIG. 25B.

When pixel data is input to the texture memory 30 via the GPU 8 as shown in FIG. 25B, the pixel data is returned inside the GPU 8 before reaching the shading processing section 21 of the GPU 8 and input to the texture memory 30. A portion of the GPU 8 at which the pixel data is returned is freely determined. In this embodiment, a case wherein the pixel data is returned at the memory I/F 11 is shown as an example. The memory I/F 11 receives pixel data. If the pixel data is to be input to the shading processing section 21, the memory I/F 11 inputs the pixel data to the shading processing section 21 via the system I/F 9. On the other hand, if the pixel data is to be input to the texture memory 30, the memory I/F 11 returns and inputs pixel data to the texture memory 30.

In the sixth embodiment, in the example shown in FIG. 25A, since pixel data is directly input from the frame buffer 31 to the texture memory 30, the processing speed becomes high and excellent. On the other hand, when the video memory 13 is externally attached and mounted on a chip different from that of the GPU 8, it is necessary to provide the path 87 which connects the frame buffer 31 and texture memory 30 to each other. Therefore, for example, it becomes necessary to change the system of the graphics card 75.

On the other hand, in the example shown in FIG. 25B, it is not necessary to provide the path 87 and an advantage that it is not necessary to change the system of the graphics card 75 can be attained.

Thus, in a case where pixel data is returned to the shading processing section 21 via the output of the texture memory 30, two methods are provided: one method is to directly input pixel data from the frame buffer 31 to the texture memory 30 and the other method is to input pixel data from the frame buffer 31 to the texture memory 30 via the GPU 8. One of the methods which should be used may be determined as required.

This invention has been explained by use of the first to sixth embodiments, but this invention is not limited to the above embodiments. When the present invention is embodied, this invention can be variously modified without departing from the technical scope thereof.

For example, in the GPU 8 according to the above embodiment, the video memory 13 is provided on an LSI chip different from that of the GPU 8 as shown in FIG. 26A, but it is also possible to integrate the video memory 13, that is, the texture memory 30 and frame buffer 31 on the LSI chip of the GPU 8 as shown in FIG. 26B.

Further, even if an exclusive memory is not provided as the video memory 13, the function of the video memory 13 can be attained by use of a CPU memory 15 as shown in FIG. 26C, for example. Further, it is also possible to attain the function of the video memory 13 by use of a hard disc 4 or main memory 17 of the electronic device as shown in FIG. 26D.

The above embodiments can be independently carried out and can also be carried out in adequate combination.

Further, in the above embodiments, inventions of various stages are contained and the inventions of various stages can be extracted by adequately combining a plurality of constituents disclosed in the above embodiments.

As described above, according to the above embodiments, it is possible to provide a graphics processor, graphics card and graphics processing system which can enhance the operation ability and processing speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graphics processor comprising:
   a shading processing section which subjects pixel data to a shading process;
   a first path which permits map data and texture data output from a video memory to be input to the shading processing section;
   a second path which permits pixel data output from the shading processing section to be output to the video memory; and
   a third path which permits pixel data output from a pixel expanding section to be input to the shading processing section; and
   a fourth path which permits pixel data output from the video memory to be input to the shading processing section.

2. The graphics processor according to claim 1, further comprising a write address calculating section which calculates a write address of pixel data output from the shading processing section with respect to the video memory according to write address calculation information.

3. The graphics processor according to claim 2, wherein the write address calculation information contains information corresponding to a pixel expanding system.

4. The graphics processor according to claim 2, wherein the write address calculation information contains information which indicates a position of an environment map.

5. The graphics processor according to claim 2, wherein the write address calculation information contains information which indicates the depth of a pixel.

6. The graphics processor according to claim 2, wherein the write address calculation information is attached to an output of the shading processing section.

7. The graphics processor according to claim 6, wherein the write address calculation information contains information corresponding to a pixel expanding system.

8. The graphics processor according to claim 6, wherein the write address calculation information contains information which indicates a position of an environment map.

9. The graphics processor according to claim 6, wherein the write address calculation information contains information which indicates the depth of a pixel.

10. A graphics processor comprising:
    a shading processing section which subjects pixel data to a shading process;
    a first path which permits map data and texture data output from a video memory to be input to the shading processing section;
    a second path which permits pixel data output from the shading processing section to be output to the video memory; and a write address calculating section which calculates a write address of pixel data output from the shading processing section with respect to the video memory according to write address calculation information.

11. The graphics processor according to claim 10, wherein the write address calculation information contains information corresponding to a pixel expanding system.

12. The graphics processor according to claim 10, wherein the write address calculation information contains information which indicates a position of an environment map.

13. The graphics processor according to claim 10, wherein the write address calculation information contains information which indicates the depth of a pixel.

14. The graphics processor according to claim 10, wherein the write address calculation information is attached to an output of the shading processing section.

15. The graphics processor according to claim 14, wherein the write address calculation information contains information corresponding to a pixel expanding system.

16. The graphics processor according to claim 14, wherein the write address calculation information contains information which indicates a position of an environment map.

17. The graphics processor according to claim 14, wherein the write address calculation information contains information which indicates the depth of a pixel.

18. A graphics card comprising:
a first connector which can be connected to an electronic device;
a pixel expanding section which receives image display data via the first connector and expands the image display data into pixels to create pixel data;
a shading processing section which subjects the pixel data to a shading process;
a video memory;
a first path which permits map data and texture data output from the video memory to be input to the shading processing section;
a second path which permits pixel data output from the shading processing section to be output to the video memory;
a third path which permits pixel data output from the pixel expanding section to be input to the shading processing section;
a fourth path which permits pixel data output from the video memory to be input to the shading processing section;
a D/A converter which converts a screen image output from the video memory into a video signal; and
a second connector which can connect an output of the D/A converter to a display unit.

19. The graphics card according to claim 18, further comprising a write address calculating section which calculates a write address of pixel data output from the shading processing section with respect to the video memory according to write address calculation information.

20. The graphics card according to claim 19, wherein the write address calculation information contains information corresponding to a pixel expanding system.

21. The graphics card according to claim 19, wherein the write address calculation information contains information which indicates a position of an environment map.

22. The graphics card according to claim 19, wherein the write address calculation information contains information which indicates the depth of a pixel.

23. The graphics card according to claim 19, wherein the write address calculation information is attached to an output of the shading processing section.

24. The graphics card according to claim 23, wherein the write address calculation information contains information corresponding to a pixel expanding system.

25. The graphics card according to claim 23, wherein the write address calculation information contains information which indicates a position of an environment map.

26. The graphics card according to claim 23, wherein the write address calculation information contains information which indicates the depth of a pixel.

27. A graphics card comprising:
a first connector which can be connected to an electronic device;
a pixel expanding section which receives image display data via the first connector and expands the image display data into pixels to create pixel data;
a shading processing section which subjects the pixel data to a shading process;
a video memory;
a first path which permits map data and texture data output from the video memory to be input to the shading processing section;
a second path which permits pixel data output from the shading processing section to be output to the video memory;
a write address calculating section which calculates a write address of pixel data output from the shading processing section with respect to the video memory according to write address calculation information;
a D/A converter which converts a screen image output from the video memory into a video signal; and
a second connector which can connect an output of the D/A converter to a display unit.

28. The graphics card according to claim 27, wherein the write address calculation information contains information corresponding to a pixel expanding system.

29. The graphics card according to claim 27, wherein the write address calculation information contains information which indicates a position of an environment map.

30. The graphics card according to claim 27, wherein the write address calculation information contains information which indicates the depth of a pixel.

31. The graphics card according to claim 27, wherein the write address calculation information is attached to an output of the shading processing section.

32. The graphics card according to claim 31, wherein the write address calculation information contains information corresponding to a pixel expanding system.

33. The graphics card according to claim 31, wherein the write address calculation information contains information which indicates a position of an environment map.

34. The graphics card according to claim 31, wherein the write address calculation information contains information which indicates the depth of a pixel.

35. A graphics processing system comprising:
an interface bus which can be connected to a peripheral device;
a CPU;
a bus bridge connected to the interface bus and CPU;
a pixel expanding section which receives image display data via the bus bridge and expands the image display data into pixels to create pixel data;
a shading processing section which subjects the pixel data to a shading process;

a video memory;

a first path which permits map data and texture data output from the video memory to be input to the shading processing section;

a second path which permits pixel data output from the shading processing section to be output to the video memory;

a third path which permits pixel data output from the pixel expanding section to be input to the shading processing section;

a fourth path which permits pixel data output from the video memory to be input to the shading processing section; and a D/A converter which converts pixel data output from the video memory into a video signal.

36. The graphics processing system according to claim 35, further comprising a write address calculating section which calculates a write address of pixel data output from the shading processing section with respect to the video memory according to write address calculation information.

37. The graphics processing system according to claim 36, wherein the write address calculation information contains information corresponding to a pixel expanding system.

38. The graphics processing system according to claim 36, wherein the write address calculation information contains information which indicates a position of an environment map.

39. The graphics processing system according to claim 36, wherein the write address calculation information contains information which indicates the depth of a pixel.

40. The graphics processing system according to claim 36, wherein the write address calculation information is attached to an output of the shading processing section.

41. The graphics processing system according to claim 40, wherein the write address calculation information contains information corresponding to a pixel expanding system.

42. The graphics processing system according to claim 40, wherein the write address calculation information contains information which indicates a position of an environment map.

43. The graphics processing system according to claim 40, wherein the write address calculation information contains information which indicates the depth of a pixel.

44. A graphics processing system comprising:

an interface bus which can be connected to a peripheral device;

a CPU;

a bus bridge connected to the interface bus and CPU;

a pixel expanding section which receives image display data via the bus bridge and expands the image display data into pixels to create pixel data;

a shading processing section which subjects the pixel data to a shading process;

a video memory;

a first path which permits map data and texture data output from the video memory to be input to the shading processing section;

a second path which permits pixel data output from the shading processing section to be output to the video memory;

a write address calculating section which calculates a write address of pixel data output from the shading processing section with respect to the video memory according to write address calculation information; and a D/A convefler which converts pixel data output from the video memory into a video signal.

45. The graphics processing system according to claim 44, wherein the write address calculation information contains information corresponding to a pixel expanding system.

46. The graphics processing system according to claim 44, wherein the write address calculation information contains information which indicates a position of an environment map.

47. The graphics processing system according to claim 44, wherein the write address calculation information contains information which indicates the depth of a pixel.

48. The graphics processing system according to claim 44, wherein the write address calculation information is attached to an output of the shading processing section.

49. The graphics processing system according to claim 48, wherein the write address calculation information contains information corresponding to a pixel expanding system.

50. The graphics processing system according to claim 48, wherein the write address calculation information contains information which indicates a position of an environment map.

51. The graphics processing system according to claim 48, wherein the write address calculation information contains information which indicates the depth of a pixel.

* * * * *